(12) United States Patent
Kawanishi

(10) Patent No.: US 8,119,935 B2
(45) Date of Patent: Feb. 21, 2012

(54) COMBINATION WEIGHER PROVIDED WITH AN INNER CHUTE AND AN OUTER CHUTE

(75) Inventor: Shozo Kawanishi, Nishinomiya (JP)

(73) Assignee: Shozo Kawanishi, Nishinomiya-shi (JP)

( * ) Notice: Subject to any disclaimer, the term of this patent is extended or adjusted under 35 U.S.C. 154(b) by 432 days.

(21) Appl. No.: 12/297,198

(22) PCT Filed: Apr. 4, 2007

(86) PCT No.: PCT/JP2007/057583
§ 371 (c)(1),
(2), (4) Date: Mar. 26, 2009

(87) PCT Pub. No.: WO2007/119679
PCT Pub. Date: Oct. 25, 2007

(65) Prior Publication Data
US 2009/0301792 A1    Dec. 10, 2009

(30) Foreign Application Priority Data
Apr. 14, 2006 (JP) ................................. 2006-111915

(51) Int. Cl.
G01G 19/387 (2006.01)
(52) U.S. Cl. .................................................. 177/25.18
(58) Field of Classification Search .............. 177/25.18
See application file for complete search history.

(56) References Cited

U.S. PATENT DOCUMENTS

| | | | |
|---|---|---|---|
| 4,399,880 A | 8/1983 | Konishi | |
| 4,676,326 A * | 6/1987 | Konishi | 177/1 |
| 4,742,877 A * | 5/1988 | Kawanishi | 177/1 |
| 2002/0157876 A1 | 10/2002 | Yamanaka et al. | |
| 2010/0096192 A1* | 4/2010 | Kawanishi | 177/25.18 |

FOREIGN PATENT DOCUMENTS

| | | |
|---|---|---|
| JP | 57-125322 | 8/1982 |
| JP | 60-161530 | 8/1985 |
| JP | 62-30122 | 2/1987 |
| JP | 62-091819 | 4/1987 |

(Continued)

OTHER PUBLICATIONS

International Search Report for PCT/JP2007/057583, dated Jun. 29, 2007.

(Continued)

Primary Examiner — Randy W Gibson
(74) Attorney, Agent, or Firm — Marshall, Gerstein & Borun LLP

(57) ABSTRACT

A combination weigher of the present invention comprises an inner chute which gathers objects which are discharged in an inward direction from weighing hoppers and discharges the objects, a plurality of outer chutes which gather the objects which are discharged in an outward direction from the weighing hoppers, a collecting hopper provided at discharge outlet of the inner chute, collecting hoppers provided at discharge outlets of the outer chutes, a lower chute which transfers the objects which are discharged from a collecting hopper, and discharges them from a discharge outlet at a bottom part thereof, and a control unit which is configured to switch a discharge direction of the weighing hoppers selected to make up of optimal combinations sequentially performed every time the combination process is performed, and according to these cause the collecting hopper and the collecting hopper to alternately discharge the objects.

16 Claims, 13 Drawing Sheets

FOREIGN PATENT DOCUMENTS

| | | |
|---|---|---|
| JP | 62-254017 | 11/1987 |
| JP | 01-170815 | 7/1989 |
| JP | 03-144318 | 6/1991 |
| JP | 05-126619 | 5/1993 |
| JP | 2002-005732 | 1/2002 |
| RU | 2005110061/22 | 8/2005 |

OTHER PUBLICATIONS

Decision on Grant Patent for Russian Patent Application No. 2008144951/28(058687).
Canadian Office Action for CA Application No. 2,646,431, dated Jul. 30, 2009.

* cited by examiner

COMBINATION WEIGHER PROVIDED WITH AN INNER CHUTE AND AN OUTER CHUTE

TECHNICAL FIELD

The present invention relates to a combination weigher which feeds to a packaging machine or the like, objects to be weighed which have been weighed.

BACKGROUND ART

Objects to be weighed, such as detergents and confectionery, which have been weighed to have specified weight by a combination weigher, are typically packaged by a packaging machine. A schematic construction of a first conventional example of such a combination weigher which weighs the objects to be weighed is shown in FIG. 12.

The combination weigher of FIG. 12 is configured such that a control unit 30 controls an operation of the entire combination weigher and performs combination calculation. The combination weigher is constructed in such a manner that a center base body (body) 5 is disposed at a center of the combination weigher, and a dispersion feeder 1 having a conical shape is mounted to an upper part of the center base body (body) 5 to radially disperse objects to be weighed supplied from an external supplying device by vibration. Around the dispersion feeder 1, linear feeders 2 are provided to transfer the objects to be weighed which have been sent from the dispersion feeder 1 into respective feeding hoppers 3 by vibration. A plurality of feeding hoppers 3 and weighing hoppers 4 are disposed below the linear feeders 2 and are arranged in a circular shape in such a manner that each feeding hopper 3 and each weighing hopper 4 correspond to the associated one of the linear feeders 2. The feeding hopper 3 receives the objects to be weighed which have been sent from the linear feeder 2, and opens its gate to feed the objects to be weighed to the weighing hopper 4 located therebelow when the weighing hopper 4 becomes empty. The weighing hopper 4 is attached with a weight sensor 41 such as a load cell. The weight sensor 41 measures the weight of the objects to be weighed inside the weighing hopper 4. The control unit 30 performs combination calculation to select a combination made up of hoppers which will discharge the objects to be weighed, from the plurality of weighing hoppers 4. The weighing hoppers 4 corresponding to the combination discharge the objects to be weighed onto a collecting chute 6. The collecting chute 6 is disposed below the weighing hoppers 4. The objects to be weighed which have been discharged from the weighing hoppers 4 slide down on the collecting chute 6 and are discharged from a discharge outlet at a bottom part of the collecting chute 6. The objects to be weighed are sent out to a packaging machine which is not shown. While manufacturing package bags, the packaging machine charges the objects to be weighed which have been discharged from the combination weigher into the package bags and packages them.

In order to increase a productivity (total number of times the objects to be weighed are discharged from the combination weigher to the packaging machine) within a specified time, it is necessary to shorten a discharge cycle time. To this end, conventionally, the number of weighing hoppers was increased to a certain degree to configure so that a double shift operation is carried out rather than a single shift operation, and thus the discharge cycle time taken for the single shift operation is reduced by half. The single shift operation is carried out in a configuration in which, for example, a total number of the weighing hoppers 4 is set to ten, the number of the weighing hoppers 4 selected to make up of a combination is set to four, the combination calculation is performed once within one weighing cycle time, the weighing hoppers 4 perform discharge operation once within one weighing cycle time, and the collecting hopper 7 performs discharge operation with respect to the packaging machine once within one weighing cycle time. In order to achieve weighing precision substantially as high as that in the single shift operation when the double shift operation is carried out, the number of the weighing hoppers 4 is increased by four so that a total number of them is fourteen and the number of the weighing hoppers 4 to be selected to make up of the combination is set to four. And, the combination calculation is performed once in every ½ of one weighing cycle time, and weighing hoppers 4 making up of a combination selected in the combination calculation discharge the objects to be weighed. In this case, since the combination calculation is performed twice within one weighing cycle time, and the weighing hoppers 4 performs the discharge operation twice within one weighing cycle time, high-speed discharge operation is achieved, and the productivity is improved.

However, even when the combination weigher shown in FIG. 12 is configured to carry out the double shift operation, the speed of the objects to be weighed which have been discharged from the weighing hoppers 4 and slide down on the collecting chute 6 does not increase. For this reason, on the collecting chute, a distance between a batch of the objects to be weighed discharged from the weighing hoppers 4 selected to make up of a previous combination and a batch of the objects to be weighed discharged from the weighing hoppers 4 selected to make up of a subsequent combination is insufficient and the objects to be weighed in the previous and subsequent combinations are likely to be mixed, making it difficult to carry out the high-speed discharge operation. To solve this problem, two collecting chutes may be provided as shown in FIG. 13.

FIG. 13(a) is a schematic partial cross-sectional view showing a second example of the conventional combination weigher as viewed from laterally. FIG. 13(b) is a schematic view of collecting chutes (inner chute and outer chute) and weighing hoppers of the combination weigher as viewed from above. The combination weigher is configured in such a manner that a lower chute is incorporated into the combination weigher (such as the combination weigher disclosed in Japanese Laid Open Application No. Sho. 57- 125322) to discharge objects to be weighed into a packaging machine having one inlet.

In the combination weigher, two collecting chutes, i.e., an inner chute 6g and an outer chute 6h are provided, and each weighing hopper 4 has two gates (not shown) to be able to discharge objects to be weighed selectively to the inner chute 6g or to the outer chute 6h which is located therebelow. In addition, a collecting hopper 7g is provided at a discharge outlet 6ge provided at a bottom part of the inner chute 6g to hold and discharge the objects to be weighed, while a collecting hopper 7h is provided at a discharge outlet 6he at a bottom part of the outer chute 6h to hold and discharge the objects to be weighed. Furthermore, one lower chute 8 is provided below the two collecting hoppers 7g and 7h to feed the objects to be weighed which have been discharged from the collecting hoppers 7g and 7h into one inlet of the packaging machine. A control unit 31 controls an operation of the entire combination weigher and performs combination calculation. The combination weigher is configured to carry out the double shift operation in such a manner that the weighing hoppers 4 selected sequentially to make up of the combinations discharge the objects to be weighed alternately to the inner chute 6g and to the outer chute 6h and the collecting hopper 7g and the collecting hopper 7h alternately discharge the objects to be weighed to the lower chute 8. Thereby, the objects to be weighed are discharged twice from the discharge outlet 8a of the lower chute 8 within one weighing cycle time. So, the high-speed operation is achieved. Also, since the weighing hoppers 4 discharge the objects to be weighed to each of the inner chute 6g and the outer chute 6h only once within one weighing cycle time, a sufficient distance can be provided between a batch of the objects to be weighed which are discharged previously and a batch of the objects to be weighed which are discharged subsequently on each of the chutes.

In cases where the combination weigher is not equipped with the lower chute 8, two packaging machines or a twin-inlet packaging machine having two inlets are/is disposed below the combination weigher, and the objects to be weighed which have been discharged from the collecting hoppers 7g and 7h are fed into the associated packaging machine inlets. In this case, by the double shift operation, the objects to be weighed are discharged once to each of the two packaging machine inlets within one weighing cycle time. That is, the objects to be weighed are discharged twice in total within one weighing cycle time irrespective of the presence or absence of the lower chute 8. Thus, productivity within a specified time period can be improved.

Japanese Examined Patent Application Publication No. Hei. 8-125322 discloses a configuration of a combination weigher which is capable of carrying out a combination discharge operation at a higher speed. In this configuration, a funnel-shaped inner chute is disposed below weighing hoppers and right and left outer chutes are disposed to surround the inner chute. Intermediate hoppers are respectively provided at discharge outlets at bottom parts of these three chutes. Furthermore, three first timing hoppers are disposed below the three intermediate hoppers to discharge the objects to be weighed to a first lower chute and three second timing hoppers are disposed below the three intermediate hoppers to discharge the objects to be weighed to a second lower chute. The objects to be weighed can be fed from the first and second lower chutes to the two packaging machines or the twin-inlet packaging machine. In this case, a combination for discharging the objects to be weighed to the right outer chute is determined by selecting weighing hoppers from those belonging to a right group, a combination for discharging the objects to be weighed to the left outer chute is determined by selecting weighing hoppers from those belonging to a left group, and a combination for discharging the objects to be weighed to the inner chute is selected from the remaining weighing hoppers. The weighing hoppers selected to make up of these three combinations discharge the objects to be weighed simultaneously, and the intermediate hoppers provided at the discharge outlets of the three chutes hold the objects to be weighed. Holding the objects to be weighed, each of the intermediate hoppers discharges the objects to be weighed alternately to the associated one of the three first timing hoppers and to the associated one of the three second timing hoppers. The three first timing hoppers sequentially discharge the objects to be weighed to the first lower chute, while the three second timing hoppers sequentially discharge the objects to be weighed to the second lower chute.

DISCLOSURE OF THE INVENTION

Problems to be Solved by the Invention

However, in the configuration of FIG. 13, since the discharge outlets 6ge and 6he of the inner chute 6g and the outer chute 6h provided with the collecting hopper 7g and the collecting hopper 7h, respectively, are positioned distant from a center of a circle formed by arrangement of the weighing hoppers 4, a distance over which the objects to be weighed which are discharged from the weighing hopper 4 to the chute 6g or 6h are transferred to the associated discharge outlet 6ge or 6he (collecting hopper 7g or 7h) and inclination of the chute are varied significantly, depending on the location of the weighing hopper 4, there is a significant variation in time when the objects to be weighed which have been transferred on the chute 6g or 6h reach the discharge outlet 6ge or 6he (collecting hopper 7g or 7h), and a time taken to transfer the objects to be weighed on the collecting chute 6g or 6h becomes long, depending on the location of the weighing hopper 4. In particular, since the objects to be weighed which have been discharged from the weighing hopper 4 (e.g., weighing hopper 4 located on the right side in FIG. 13(*a*)) located distant from the collecting hopper 7h to the outer chute 6h are transferred on the outer chute 6h disposed to surround the periphery of the inner chute 6g and reach the collecting hopper 7h, they reach at a time that is later than a time when the objects to be weighed which have been discharged from the weighing hopper 4 (e.g., weighing hopper 4 located on the left side in FIG. 13(*a*)) located closer to the collecting hopper 7h reach the collecting hopper 7h. For this reason, a long time lapses from when a tip part of a batch of the objects to be weighed which have been discharged simultaneously from a plurality of weighing hoppers 4 to the outer chute 6h reach the collecting hopper 7h until a tail part of the batch of the objects to be weighed reach the collecting hopper 7h. In this case, also, unless the operation speed is set low, a sufficient distance is unable to be provided between a batch of the objects to be weighed which are discharged onto the outer chute 6h previously and a batch of the objects to be weighed which are discharged onto the collecting chute 6h subsequently or they are likely to be mixed, depending on characteristic of the objects to be weighed, for example, when the objects to be weighed are bulky (bulk density is low). This makes it difficult for the combination weigher to operate at a high speed. In a case where, in order to avoid that the objects to be weighed are not discharged from the weighing hopper 4 which is distant from the collecting hopper 7 to the outer chute 6h, combination calculation is carried out without using measured value of the weighing hopper 4 (specified weighing hopper) which is distant from the collecting hopper 7h to prevent that weighing hopper 4 from being selected to make up of a combination for discharging the objects to be weighed to the outer chute 6h, combination weighing precision (weighing precision of combination weight values) for the objects to be weighed which are discharged to the outer chute 6h becomes lower.

Also, the outer chute 6h is disposed so that the objects to be weighed which have been discharged from the weighing hopper 4 located closer to the collecting hopper 7g of the inner chute 6g to the outer chute 6h are transferred to the collecting hopper 7h through the outside of the periphery of the inner chute 6g. Therefore, the collecting chute consisting of the outer chute and the inner chute is complicated in structure.

Furthermore, in the above described configuration of the patent document 2, since the three intermediate hoppers provided respectively at the inner chute and the right and left outer chutes are each required to selectively discharge the objects to be weighed in one direction to the first timing hopper or in an opposite direction to the second timing hopper, the discharge gates of the intermediate hoppers are complicated in structure.

The present invention has been made to solve the above described problem, and an object of the present invention is to provide a combination weigher which is provided with a collecting chute having a relatively simple structure, and is capable of reducing a time taken to transfer objects to be weighed on the collecting chute without decreasing combination weighing precision and irrespective of characteristics of almost all objects to be weighed, thereby enabling a high-speed operation. Another object of the present invention is to provide a combination weigher capable of discharging the objects to be weighed to two packaging machine inlets using a simple structure.

Means For Solving the Problems

To achieve the above describe object, a combination weigher of a first aspect of the present invention comprises a plurality of combination hoppers which are arranged in a circle shape and are each fed with objects to be weighed, the combination hoppers being each configured to be able to discharge the objects to be weighed selectively in an inward direction of the circle shape or in an outward direction of the circle shape; an inner chute which is disposed below the combination hoppers and is configured to gather the objects to be weighed which have been discharged in the inward direction from the combination hoppers and to discharge the objects to be weighed from a discharge outlet provided at a bottom part thereof; a plurality of outer chutes which are disposed below the combination hoppers and are arranged side by side so as to surround the inner chute, the outer chutes being each configured to gather the objects to be weighed which have been discharged in the outward direction from the combination hoppers and to discharge the objects to be weighed from a discharge outlet provided at a bottom part thereof; a combination calculation means which is configured to determine a first discharge combination and a second discharge combination, the first discharge combination and the second discharge combination each including combination hoppers selected from among combination hoppers disposed above the inner chute and the plurality of outer chutes and each having a combination weight value within an allowable range with respect to a target weight value, the combination weight value being a total of weights of the objects to be weighed which are held by the combination hoppers; and a control means which is configured to cause the combination hoppers making up of the first discharge combination to discharge the objects to be weighed in the inward direction to discharge the objects to be weighed to the inner chute and to cause the combination hoppers making up of the second discharge combination to discharge the objects to be weighed in the outward direction to discharge the objects to be weighed to the outer chute.

In such a configuration, since the plurality of outer chutes are arranged to surround the inner chute, a structure is relatively simple, and it becomes possible to shorten and substantially equalize distances over which the objects to be weighed which have been discharged from the combination hoppers to the associated outer chutes are transferred on associated outer chutes, irrespective of the location of the combination hoppers. And, irrespective of the characteristics of almost all the objects to be weighed, all the objects to be weighed which have been discharged from the combination hoppers to the associated outer chutes can be discharged from the discharge outlets of the associated outer chutes in a short time. Therefore, the combination weigher is able to have the collecting chutes (inner chute and outer chute) having a relatively simple structure, and is able to operate at a high speed by shortening the time taken to transfer the objects to be weighed on the collecting chutes irrespective of the characteristics of almost all the objects to be weighed, without degrading combination weighing precision.

In a combination weigher of a second aspect, according to the combination weigher of the first aspect, the combination calculation means is configured to perform repetitive combination processes in such a manner that: combination calculation is performed based on weights of objects to be weighed which are held by the combination hoppers to determine as an optimal combination one combination made up of combination hoppers in which a combination weight value is within the allowable range with respect to the target weight value, and the combination calculation is performed based on weights of objects to be weighed which are held by combination hoppers which do not belong to an optimal combination determined in a previous combination process, in a subsequent combination process in n (n: plural number) times of successive combination processes in the repetitive combination processes, to determine optimal combinations determined sequentially in the repetitive combination processes, as the first discharge combination and the second discharge combination alternately; wherein the control means is configured to cause the combination hoppers making up of the first discharge combination and the combination hoppers making up of the second discharge combination to alternately discharge the objects to be weighed, based on the first discharge combination and the second discharge combination alternately determined by the combination calculation means; and wherein the control means is configured to feed, to the same packaging machine inlet, the objects to be weighed which have been discharged from the discharge outlet of the inner chute and the objects to be weighed which have been discharged from the discharge outlets of the plurality of outer chutes.

In such a configuration, since the combination process can be performed n times within one operation cycle time (e.g., one weighing cycle time), and the objects to be weighed can be discharged to the same packaging machine inlet n times within one operation cycle time, a productivity within a specified time period can be improved. In addition, since the objects to be weighed inside the combination hoppers are discharged to the inner chute and to the outer chute alternately for the respective discharge combinations determined sequentially, that is, the objects to be weighed are discharged from the combination hoppers to the inner chute and to the outer chute only n/2 times within one operation cycle time, a sufficient distance can be provided between a batch of the objects to be weighed which are discharged previously and a batch of the objects to be weighed which are discharged subsequently on each of the chutes. In the case of n=2, a double shift operation takes place, while in the case of n=3, a triple shift operation takes place.

In a combination weigher of a third aspect, according to the combination weigher of the first aspect, the combination calculation means is configured to perform repetitive combination processes in such a manner that: combination calculation is performed based on weights of objects to be weighed which are held by the combination hoppers to determine as an optimal combination one combination made up of combination hoppers in which a combination weight value is within the allowable range with respect to the target weight value, and the combination calculation is performed based on weights of objects to be weighed which are held by combination hoppers which do not belong to an optimal combination determined in a previous combination process, in a subsequent combination process in n (n: plural number) times of successive combination processes in the repetitive combination processes, to determine optimal combinations determined sequentially in the repetitive combination processes, as the first discharge combination and the second discharge combination alternately; wherein the control means is configured to cause the combination hoppers making up of the first discharge combination and the combination hoppers making up of the second discharge combination to alternately discharge the objects to be weighed, based on the first discharge combination and the second discharge combination alternately determined by the combination calculation means; and wherein the control means is configured to feed the objects to be weighed which have been discharged from the discharge outlet of the inner chute to a first packaging machine inlet, and feed the objects to be weighed which have been discharged from the discharge outlets of the plurality of outer chutes to a second packaging machine inlet.

In such a configuration, since the combination process can be performed n times within one operation cycle time (e.g., one weighing cycle time), and the objects to be weighed can be discharged to each of the two packaging machine inlets n/2 (n times in total) times within one operation cycle time, a productivity within a specified time period can be improved. In addition, since the objects to be weighed inside the combination hoppers are discharged to the inner chute and to the outer chute alternately for the respective discharge combinations determined sequentially, that is, the objects to be weighed are discharged from the combination hoppers to each of the inner chute and to the outer chute only n/2 times within one operation cycle time, a sufficient distance can be provided between a batch of the objects to be weighed which are discharged previously and a batch of the objects to be weighed which are discharged subsequently on each of the chutes. In the case of n=2, a double shift operation takes place, while in the case of n=3, a triple shift operation takes place.

In a combination weigher of a fourth aspect, according to the combination weigher of the first aspect, the combination calculation means is configured to perform a combination process in such a manner that combination calculation is performed based on the weights of the objects to be weighed which are held by the combination hoppers to determine two combinations which do not include the same combination hopper and in which combination weight values obtained in the combination calculation are within the allowable range with respect to the target weight value and to determine one of the two combinations as the first discharge combination and the other as the second discharge combination; wherein the control means is configured to cause the combination hoppers making up of the first discharge combination and the combination hoppers making up of the second discharge combination to discharge the objects to be weighed simultaneously; and wherein the control means is configured to feed the objects to be weighed which have been discharged from the discharge outlet of the inner chute to a first packaging machine inlet and the objects to be weighed which have been discharged from the discharge outlets of the plurality of outer chutes to a second packaging machine inlet.

In such a configuration, two discharge combinations are determined in one combination process, and the objects to be weighed of the two discharge combinations are discharged simultaneously, productivity within a specified time can be improved.

In addition, since the objects to be weighed inside the combination hoppers making up of one of the two discharge combinations are discharged to the inner chute and the objects to be weighed inside the combination hoppers making up of the other discharge combination are discharged to the outer chute, a sufficient distance can be provided between a batch of the objects to be weighed which are discharged previously and a batch of the objects to be weighed which are discharged subsequently on each of the chutes. Furthermore, since the two discharge combinations are determined simultaneously, weights of the objects to be weighed of a number of combination hoppers can be used in the combination calculation for determining the two discharge combinations. As a result, combination weighing precision for the objects to be weighed which are discharged can be improved as a whole.

In a combination weigher of a fifth aspect, according to the combination weigher of the fourth aspect, the combination calculation means is configured to perform the combination calculation based on weights of objects to be weighed which are held by combination hoppers which do not belong to the first and second discharge combinations determined in a previous combination process, in a subsequent combination process, in k (k: plural number) times of successive combination processes in the repetitive combination processes.

In such a configuration, since the combination process is performed k times within one operation cycle time (e.g., one weighing cycle time) and the objects to be weighed can be discharged from each of the inner chute and the outer chute k times within one operation cycle time, the combination weigher can be easily adapted to two packaging machines operated at a high speed or a twin-type packaging machine operated at a high speed. For example, k is 2, 3, etc.

In a combination weigher of a sixth aspect, according to the combination weigher of the first aspect, a first collecting hopper is provided at the discharge outlet of the inner chute to hold the objects to be weighed which have been discharged from the discharge outlet of the inner chute and to discharge the objects to be weighed, and a plurality of second collecting hoppers are respectively provided at the discharge outlets of the plurality of outer chutes to hold the objects to be weighed which have been discharged from the discharge outlets of the outer chutes and to discharge the objects to be weighed. Also, the control means is configured to control the first collecting hopper holding the objects to be weighed which have been discharged from the combination hoppers and the plurality of second collecting hoppers holding the objects to be weighed which have been discharged from the combination hoppers to cause the first collecting hopper to discharge the objects to be weighed and to cause the plurality of second collecting hoppers to simultaneously discharge the objects to be weighed.

In such a configuration, since the first and second collecting hoppers are provided so that the objects to be weighed are discharged in a state of being lumped together, the packaging machine can easily carry out a packaging operation for packaging the objects to be weighed.

In a combination weigher of a seventh aspect, according to the combination weigher of the sixth aspect, the combination calculation means is configured to determine the second discharge combination so that the objects to be weighed which have been discharged from the combination hoppers making up of the second discharge combination are discharged to at least two outer chutes.

In such a configuration, since the second discharge combination is determined to include combination hoppers disposed above respective of at least the two outer chutes, i.e., combinations hoppers respectively corresponding to the respective of at least the two outer chutes, and the objects to be weighed corresponding to that combination are gathered to respective of the at least two second collecting hoppers, the size (volume) of the second collecting hoppers can be reduced.

In a combination weigher of an eighth aspect, according to the combination weigher of the sixth aspect, the combination calculation means is configured to perform repetitive combination processes in such a manner that: combination calculation is performed based on weights of objects to be weighed which are held by the combination hoppers to determine as an optimal combination one combination made up of combination hoppers in which a combination weight value is within the allowable range with respect to the target weight value, and the combination calculation is performed based on weights of objects to be weighed which are held by combination hoppers which do not belong to an optimal combination determined in a previous combination process, in a subsequent combination process in a subsequent combination process in n (n: plural number) times of successive combination processes in the repetitive combination processes, to determine optimal combinations determined sequentially in the repetitive combination processes, as the first discharge combination and the second discharge combination alternately. Also, the control means is configured to cause the combination hoppers making up of the first discharge combination and the combination hoppers making up of the second discharge combination to alternately discharge the objects to be weighed, and to cause the first collecting hopper and the plurality of second collecting hoppers to discharge the objects to be weighed alternately, based on the first discharge combination and the second discharge combination alternately determined by the combination calculation means. Also, the control means is configured to feed, to the same packaging machine inlet, the objects to be weighed which have been discharged from the first collecting hopper and the objects to be weighed which have been discharged from the second plurality of collecting hoppers.

In such a configuration, the same advantages as those in the combination weigher of the second aspect can be achieved. In addition, since the first and second collecting hoppers are provided so that the objects to be weighed are discharged in a state of being lumped together, the packaging machine can easily carry out a packaging operation for packaging the objects to be weighed.

In a combination weigher of a ninth aspect, according to the combination weigher of the sixth aspect, the combination calculation means is configured to perform repetitive combination processes in such a manner that: combination calculation is performed based on weights of objects to be weighed which are held by the combination hoppers to determine as an optimal combination one combination made up of combination hoppers in which a combination weight value is within the allowable range with respect to the target weight value, and the combination calculation is performed based on weights of objects to be weighed which are held by combination hoppers which do not belong to an optimal combination determined in a previous combination process, in a subsequent combination process in n (n: plural number) times of successive combination processes in the repetitive combination processes, to determine optimal combinations determined sequentially in the repetitive combination processes, as the first discharge combination and the second discharge combination alternately. Also, the control means is configured to cause the combination hoppers making up of the first discharge combination and the combination hoppers making up of the second discharge combination to alternately discharge the objects to be weighed, and to cause the first collecting hopper and the plurality of second collecting hoppers to discharge the objects to be weighed alternately, based on the first discharge combination and the second discharge combination alternately determined by the combination calculation means. Also, the control means is configured to feed the objects to be weighed which have been discharged from the first collecting hopper to a first packaging machine inlet and the objects to be weighed which have been discharged from the plurality of second collecting hoppers to a second packaging machine inlet.

In such a configuration, the same advantages as those in the combination weigher of the third aspect can be achieved. In addition, since the first and second collecting hoppers are provided so that the objects to be weighed are discharged in a state of being lumped together, the packaging machine can easily carry out a packaging operation for packaging the objects to be weighed. Furthermore, since the objects to be weighed which have been discharged from the first collecting hopper are fed to the first packaging machine inlet and the objects to be weighed which have been discharged from the plurality of second collecting hoppers are fed to the second packaging machine inlet, it suffices to configure so that the first collecting hopper and the plurality of second collecting hoppers are able to discharge the objects to be weighed only in their specified one directions. So, the discharge gates of the collecting hoppers have a simple structure.

In a combination weigher of a tenth aspect, according to the combination weigher of the sixth aspect, the combination calculation means is configured to perform a combination process in such a manner that combination calculation is performed based on the weights of the objects to be weighed which are held by the combination hoppers to determine two combinations which do not include the same combination hopper and in which combination weight values obtained in the combination calculation are within the allowable range with respect to the target weight value and to determine one of the two combinations as the first discharge combination and the other as the second discharge combination; wherein the control means is configured to cause the combination hoppers making up of the first discharge combination and the combination hoppers making up of the second discharge combination to discharge the objects to be weighed simultaneously, and to cause the first collecting hopper and the plurality of second collecting hoppers to discharge the objects to be weighed simultaneously; and wherein the control means is configured to feed the objects to be weighed which have been discharged from the first collecting hopper to a first packaging machine inlet and the objects to be weighed which have been discharged from the plurality of second collecting hoppers to a second packaging machine inlet.

In such a configuration, the same advantages as those in the combination weigher of the fourth aspect can be achieved. In addition, since the first and second collecting hoppers are provided so that the objects to be weighed are discharged in a state of being lumped together, the packaging machine can easily carry out a packaging operation for packaging the objects to be weighed. Furthermore, since the objects to be weighed which have been discharged from the first collecting hopper are fed to the first packaging machine inlet and the objects to be weighed which have been discharged from the plurality of second collecting hoppers are fed to the second packaging machine inlet, it suffices to configure so that the first collecting hopper and the plurality of second collecting hoppers are able to discharge the objects to be weighed only in their specified one directions. So, the discharge gates of the collecting hoppers have a simple structure.

In a combination weigher of an eleventh aspect, according to the combination weigher of the tenth aspect, the combination calculation means is configured to perform the combination calculation based on weights of objects to be weighed which are held by combination hoppers which do not belong to the first and second discharge combinations determined in a previous combination process, in a subsequent combination process in k (k: plural number) times of successive combination processes in the repetitive combination processes.

In such a configuration, since the combination process is performed k times within one operation cycle time (e.g., one weighing cycle time) and the objects to be weighed can be discharged from each of the first and second collecting hoppers k times within one operation cycle time (e.g., one weighing cycle time), the combination weigher can be easily adapted to two packaging machine operated at a high speed or the twin-type packaging machine operated at a high speed. For example, k is 2, 3, etc.

In the combination weigher of a twelfth aspect, according to the combination weigher of the fourth or the tenth aspect, the combination process performed by the combination calculation means includes: a first process in which combination calculation is performed based on weights of the objects to be weighed which are held by the combination hoppers to determine as optimal combinations, combinations of combination hoppers in which combination weight values are within the allowable range with respect to the target weight value, and an optimal combination pair consisting of two optimal combinations which do not include the same combination hopper is determined; and a second process in which for each optimal combination pair, a total of absolute values of differences between combination weight values of the first and the second optimal combinations included in the optimal combination pair and the target weight value is calculated, one optimal combination pair in which the total of the absolute values of the differences is smallest is selected, one of two optimal combinations composing the selected optimal combination pair is determined as the first discharge combination and the other is determined as the second discharge combination.

In such a configuration, since the optimal combination pair in which the total of absolute values of the differences between the combination weight values of the optimal combinations and the target weight value is smallest is selected, and the two optimal combinations included in the optimal combination pair are determined as the discharge combinations, combination weighing precision for the objects to be weighed which are discharged from the combination hoppers belonging to the respective discharge combinations can be improved as a whole.

In a combination weigher of a thirteenth aspect, according to the combination weigher of the fourth or the tenth aspect, the combination process performed by the combination calculation means includes a first process in which combination calculation is performed based on weights of the objects to be weighed which are held by the combination hoppers to determine as allowable combinations, combinations of combination hoppers in which combination weight values are within the allowable range with respect to the target weight value, m (m: plural number) allowable combinations are selected as first optimal combinations from the allowable combinations by giving priority to allowable combinations in which absolute values of differences between combination weight values and the target weight value are smaller, one allowable combination in which an absolute value of a difference between a combination weight value and the target weight value is smallest is selected as a second optimal combination from allowable combinations made up of combination hoppers which are obtained by excluding combination hoppers belonging to each of the first optimal combinations, to determine m optimal combination pairs each consisting of associated first and second optimal combinations; and a second process in which for each optimal combination pair, a total of absolute values of differences between combination weight values of optimal combinations included in the optimal combination pair and the target weight value is calculated, one optimal combination pair in which the total of the absolute values of the differences is smallest is selected, one of the first and second optimal combinations composing the selected optimal combination pair is determined as the first discharge combination and the other is determined as the second discharge combination.

In such a configuration, since the optimal combination pair in which the total of the absolute values of the differences between the combination weight values of the first and second optimal combinations and the target weight value is smallest is selected, and the two optimal combinations included in the optimal combination pair are respectively determined as the discharge combinations, combination weighing precision for the objects to be weighed which are discharged from the combination hoppers belonging to the respective discharge combinations can be improved as a whole.

In a combination weigher of a fourteenth aspect, according to the combination weigher of the fourth or the tenth aspect, the combination process is performed by the combination calculation means in such a manner that combination calculation is performed based on weights of the objects to be weighed which are held by the combination hoppers to determine, as allowable combinations, combinations in which combination weight values are within the allowable range with respect to the target weight value from all the allowable combination, one allowable combination in which an absolute value of a difference between a combination weight value and the target weight value is smallest is selected as a first optimal combination, one allowable combination in which an absolute value of a difference between a combination weight value and the target weight value is smallest is selected as a second optimal combination from allowable combinations made up of combination hoppers which are obtained by excluding combination hoppers belonging to the first optimal combination, and one of the first and second optimal combinations is determined as the first discharge combination, and the other is determined as the second discharge combination.

In such a configuration, one allowable combination in which the absolute value of the difference between the combination weight value and the target weight value is smallest is selected as the first optimal combination from all the allowable combinations, one allowable combination in which the absolute value of the difference between the combination weight value and the target weight value is smallest is selected as the second optimal combination from allowable combinations of combination hoppers which are obtained by excluding combination hoppers belonging to the first optimal combination, and the two optimal combinations are respectively determined as discharge combinations. Therefore, combination weighing precision for the objects to be weighed which are discharged from the combination hoppers belonging to the respective discharge combinations can be improved as a whole.

In the above described combination weigher, the combination hoppers may be weighing hoppers each of which has two weighing chambers arranged side by side in a direction in which the combination hoppers are arranged and measures weight of the objects to be weighed which are fed to the weighing chambers, the weighing chambers being each configured to discharge the objects to be weighed selectively in the inward direction or in the outward direction; and the combination calculation means may be configured to determine the first discharge combination and the second discharge combination such that the first and second discharge combinations each includes weighing chambers holding the objects to be weighed whose total weight is within the allowable range with respect to the target weight value.

In such a configuration, since the combination hoppers are weighing hoppers each having two weighing chambers, it becomes possible to suppress an increase in a diameter of a circle shape in which the combination hoppers are arranged and to increase the number of weight values used in the combination calculation so that improvement of combination weighing precision is achieved.

In the above described combination weigher, a plurality of weighing hoppers may be disposed above the combination hoppers to respectively correspond to the combination hoppers to measure weights of the objects to be weighed which are held by the weighing hoppers. Also, the combination hoppers may be memory hoppers each of which has two accommodating chambers which are fed with the objects to be weighed whose weights have been measured by the weighing hoppers, the accommodating chambers being each configured to discharge the objects to be weighed selectively in the inward direction or in the outward direction. Also, the weighing hoppers may be each configured to be able to discharge the objects to be weighed selectively to one of two accommodating chambers of an associated memory hopper. Also, the combination calculation means may be configured to determine the first discharge combination and the second discharge combination such that the first and second discharge combinations each includes accommodating chambers holding the objects to be weighed whose total weight is within the allowable range with respect to the target weight value.

In such a configuration, since the combination hoppers are memory hoppers each having two accommodating chambers, it becomes possible to suppress an increase in a diameter of a circle shape in which the combination hoppers are arranged and to increase the number of weight values used in the combination calculation so that improvement of combination weighing precision is achieved.

In the above described combination weigher, the combination hoppers may be arranged along two upper lines and one lower line, the combination hoppers located on the two upper lines may be weighing hoppers each of which measures weight of the objects to be weighed held by the weighing hopper, and the combination hoppers located on the one lower line may be memory hoppers each of which corresponds to two weighing hoppers and is fed with the objects to be weighed whose weight has been measured by the weighing hopper. Also, the objects to be weighed which are discharged in the inward direction from the weighing hoppers located on an inner line of the two upper lines may be discharged to the inner chute, and the objects to be weighed which may be discharged in the outward direction from the weighing hoppers located on the inner line are discharged to an associated memory hopper. Also, the objects to be weighed which are discharged in the inward direction from the weighing hoppers located on an outer line of the two upper lines may be discharged to the associated memory hopper, and the objects to be weighed which are discharged in the outward direction from the weighing hoppers located on the outer line may be discharged to the outer chute.

In such a configuration, since the combination hoppers are the weighing hoppers on the upper two lines and the memory hoppers on the lower one line, it becomes possible to suppress an increase in a diameter of a circle shape in which the combination hoppers are arranged and to increase the number of weight values used in the combination calculation so that improvement of combination weighing precision is achieved.

EFFECTS OF THE INVENTION

The present invention has the above described configuration, and provides advantages that the combination weigher has the collecting chutes made to have a relatively simple structure, and is able to shorten the time taken to transfer the objects to be weighed on the collecting chutes irrespective of the characteristics of almost all the objects to be weighed, and hence operate at a high speed, without degrading combination weighing precision. In addition, the present invention provides advantages that the combination weigher is able to discharge the objects to be weighed to two packaging machine inlets using a simple structure.

The above and further objects, features and advantages of the present invention will more fully be apparent from the following detailed description of preferred embodiments with reference to the accompanying drawings.

BRIEF DESCRIPTION OF THE DRAWINGS

FIG. 1(b) is a schematic view of collecting chutes and weighing hoppers of the combination weigher, as viewed from above;

FIG. 4(b) is a schematic view of collecting chutes and weighing hoppers of the combination weigher, as viewed from above;

FIG. 5(b) is a schematic view of collecting chutes and weighing hoppers of the combination weigher, as viewed from above, and FIG. 5(c) is a schematic view of two lower chutes of the combination weigher, as viewed from above;

Figure 1:
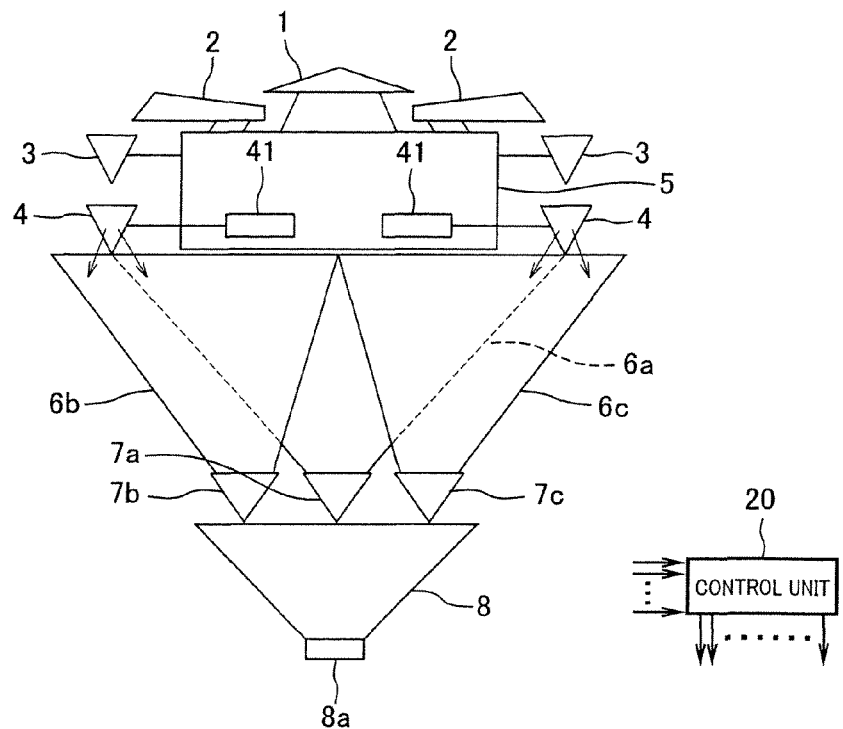
FIG. 1 (a) is a schematic partial cross-sectional view of a combination weigher according an example 1 of an embodiment 1 of the present invention, as viewed from laterally.
Figure 1:
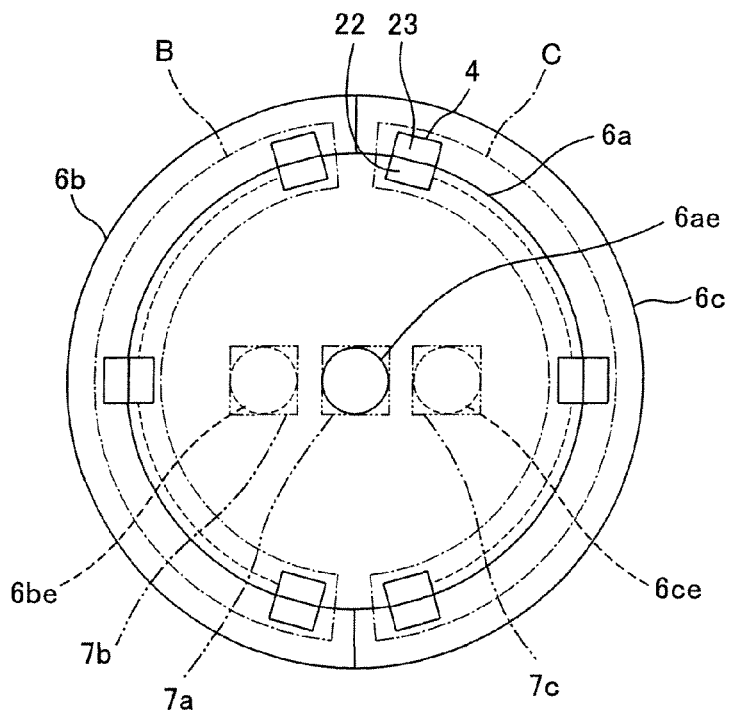

DESCRIPTION OF REFERENCE NUMERALS 1 dispersion feeder
2 linear feeder
3 feeding hopper
4 weighing hopper
5 center base body
6a inner chute
6b, 6c, 6d, 6e, 6f outer chute
7a, 7b, 7c, 7d, 7e, 7f collecting hopper
8, 8L, 8R lower chute
20 control unit

BEST MODE FOR CARRYING OUT THE INVENTION

Hereinafter, embodiments of the present invention will be described with reference to the drawings.

Embodiment 1

Example 1

FIG. 1 (a) is a schematic partial cross-sectional view of a combination weigher according an example 1 of an embodiment 1 of the present invention, as viewed from laterally, and FIG. 1(b) is a schematic view of collecting chutes (inner chutes and two outer chutes) of the combination weigher, as viewed from above.

As shown in FIG. 1(a), the combination weigher is constructed in such a manner that a center base body (body) 5 is disposed at a center of the combination weigher and supported by, for example, four legs (not shown), and a dispersion feeder 1 having a conical shape is mounted to an upper part of the center base body 5 to radially disperse objects to be weighed supplied from an external supplying device by vibration. Around the dispersion feeder 1, a plurality of linear feeders 2 are provided to transfer the objects to be weighed sent from the dispersion feeder 1 into respective feeding hoppers 3 by vibration. A plurality of feeding hoppers 3 and a plurality of weighing hoppers 4 are disposed below the linear feeders 2 and are arranged in a circular shape around the center base body 5 in such a manner that each feeding hopper 3 and each weighing hopper 4 correspond to the associated one of the linear feeders 2. The dispersion feeder 1, the linear feeders 2, the feeding hoppers 3, and the weighing hoppers 4 are mounted to the center base body 5. Inside the center base body 5, drive units therefor (vibration device for the dispersion feeder 1 and the linear feeders 2, gate opening and closing devices for the feeding hoppers 3 and the weighing hoppers 4, etc) are accommodated. Each weighing hopper 4 is attached with a weight sensor 41 such as a load cell which measures a weight of the objects to be weighed inside the weighing hopper 4. The weight sensors 41 are accommodated inside the center base body 5 along with the drive units. Each weight sensor 41 outputs a measured value to a control unit 20.

Below the weighing hoppers 4 arranged in the circular shape, an inner chute 6a having a substantially inverted cone frustum shape is disposed, and outer chutes 6b and 6c are disposed around the inner chute 6a in such a manner that outer chute 6b and 6c form two parts of a shape whose upper opening is concentric with that of the inner chute 6a. That is, the two outer chutes 6b and 6c are disposed to surround the upper opening of the inner chute 6a.

Each weighing hopper 4 is provided with gates to be able to selectively discharge the objects to be weighed to the inner chute 6a, or to the outer chute 6a or 6b located therebelow. In FIG. 1(a), within a circle 21, the substantially actual shapes of the weighing hopper 4, and the gate are illustrated. To be more specific, each weighing hopper 4 is provided with a gate (hereinafter referred to as an inner gate) 22 for discharging the objects to be weighed to the inner chute 6a, and a gate (hereinafter referred to as an outer gate) 23 for discharging the objects to be weighed to the outer chute 6b or 6c. Therefore, a bottom surface portion of one side of the weighing hopper 4 shown in FIG. 1(b) corresponds to the inneA group B including the weighing hoppers 4 disposed above the outer chute 6b corresponds to the outer chute 6b. The weighing hoppers 4 in the group B are each able to selectively discharge the objects to be weighed to the inner chute 6a or to the outer chute 6b. Likewise, a group C including the weighing hoppers 4 disposed above the outer chute 6c corresponds to the outer chute 6c. The weighing hoppers 4 in the group C are each able to selectively discharge the objects to be weighed to the inner chute 6a or to the outer chute 6c.

Collecting hoppers 7a, 7b, and 7c are provided at discharge outlets 6ae, 6be, and 6ce at the bottom parts of the chutes 6a, 6b, and 6c, respectively. One lower chute 8 is disposed below the three collecting hoppers 7a, 7b, and 7c. The lower chute 8 serves to transfer the objects to be weighed which have been discharged from all the collecting hoppers 7a, 7b, and 7c and discharge them through a discharge outlet 8a at a bottom part thereof.

Below the lower chute 8 of the combination weigher, one packaging machine (e.g., longitudinal pillow packaging machine) having an inlet which is not shown is disposed. The objects to be weighed which have been discharged from the discharge outlet 8a of the lower chute 8 are fed into the inlet of the packaging machine. The packaging machine charges the objects to be weighed which have been discharged from the combination weigher and packages them while manufacturing package bags. Thus, in the present embodiment, the objects to be weighed which have been discharged from all the collecting hoppers 7a, 7b, and 7c are configured to be fed into the same packaging machine inlet.

The control unit 20 includes a control means and a combination calculation means to control the operation of the entire combination weigher and to perform a combination process to determine a combination (discharge combination) made up of the weighing hoppers 4 which should discharge the objects to be weighed. In the combination process, the combination calculation is performed based on measured values (measured values of the weights of the objects to be weighed inside the weighing hoppers 4, which are obtained using the weight sensors 41) of the weighing hoppers 4 to determine one combination made up of the weighing hoppers 4 in which a combination weight value which is a total of the measured values is within an allowable range (predetermined weight range) with respect to a target weight value to determine it as an optimal combination. If the number of combinations in which the combination weight values are within the allowable range with respect to the target weight value is plural, a combination in which, for example, a total measured value is closest to the target weight value (or a combination whose measured value coincides with the target weight value, if any), i.e., a combination in which an absolute value of a difference between the total measured value and the target weight value is smallest, is determined as an optimal combination. In the embodiment 1, the optimal combination is a discharge combination. In the combination weigher, the target weight value and the allowable range with respect to the target weight value are predetermined. The allowable range is determined such that the target weight value is a lower limit value and a value larger than the target weight value is an upper limit value, for example. By way of example, when the target weight value is set to 400 g, the lower limit value of the allowable range is set to 400 g which is equal to the target weight value, and the upper limit value of the allowable range is set to 420 g which is larger than the target weight value. Alternatively, the allowable range may be determined such that a value smaller than the target weight value is set as the lower limit value and the upper limit value is not set (In this case, the upper limit value may be assumed to be infinite).

An outline of the operation of the combination weigher configured as described above will be first described.

The objects to be weighed are supplied from the external supplying device to the dispersion feeder 1. The dispersion feeder 1 feeds the objects to be weighed to the feeding hopper 3 through the linear feeder 2. The feeding hopper 3 feeds the objects to be weighed to the weighing hopper 4. The weight sensor 41 measures the weight of the objects to be weighed which have been fed into each weighing hopper 4, and sends the measured value to the control unit 20. Then, the above described combination process is performed to determine the optimal combination. The weighing hoppers 4 selected to make up of the optimal combination discharge the objects to be weighed and the feeding hopper 3 feeds the objects to be weighed to the weighing hoppers 4 which are empty. The linear feeder 2 feeds the objects to be weighed to the feeding hopper 3 which is empty.

In present embodiment, the combination process is performed sequentially, and the weighing hoppers 4 discharge the objects to be weighed in such a manner that the discharge direction of the weighing hoppers 4 is switched for each optimal combination determined in the combination process. To be more specific, the weighing hoppers 4 discharge the objects to be weighed alternately to the inner chute 6a and to the outer chute 6b or 6c for respective of optimal combinations sequentially determined. According to the discharge, the inner chute collecting hopper 7a and the outer chute collecting hopper 7b or 7c alternately discharge the objects to be weighed.

Subsequently, an operation of the combination weigher which takes place when the combination weigher is configured to carry out the double shift operation will be described in detail. In the double shift operation, the number of weighing hoppers 4 in each of the groups B and C may be set to seven so that the total number of the weighing hoppers 4 in each of the groups B and C is fourteen, and the number of the weighing hoppers 4 which would be selected in the combination process (the number of weighing hoppers 4 which would be selected to make up of the optimal combination) may be set to four. This makes it possible to achieve weighing precision substantially as high as that in the single shift operation carried out under the condition in which the total number of weighing hoppers 4 is ten and the number of weighing hoppers 4 which would be selected in the combination process is four. The phrase "the number of the weighing hoppers 4 which would be selected in the combination process is set to four" means that the linear feeder 2 and others are configured to operate so that a target feed amount of the objects to be weighed which are fed from each feeding hopper 3 to the weighing hopper 4 once becomes approximately ¼ of the target weight value.

Figure 2:
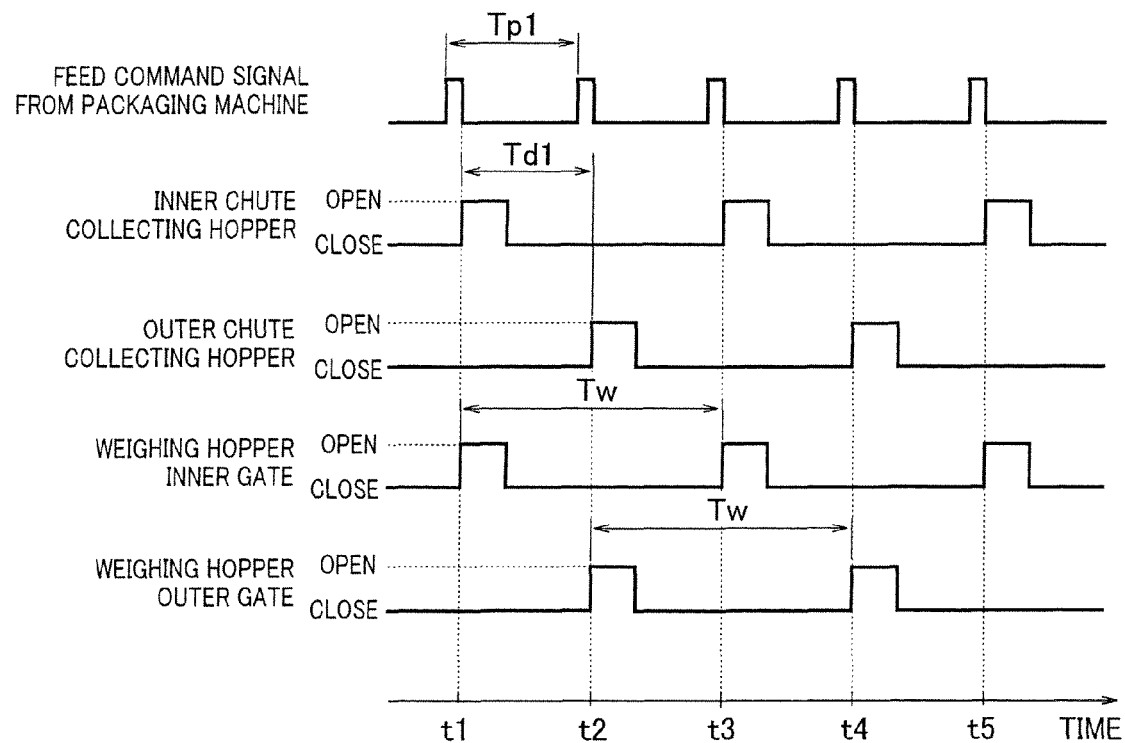
FIG. 2 is a timing chart showing a double shift operation of the combination weigher of the embodiment 1 of the present invention.

FIG. 2 is a timing chart showing the double shift operation carried out in the combination weigher according to the present embodiment.

One weighing cycle time Tw is, for example, a time period taken to accomplish a procedure in which, weighing hoppers 4 selected to make up of a discharge combination determined in a combination process in a previous weighing cycle start to discharge the objects to be weighed, the objects to be weighed are subsequently fed to these weighing hoppers 4 making up of the discharge combination, time for stabilizing the associated weight sensors 41 lapses, these weight sensors 41 measure the weights of the objects to be weighed, and thereafter a combination process is performed using at least the measured values of the weighing hoppers 4 to determine a discharge combination. In the example shown in FIG. 2, one weighing cycle time Tw is equal to one operation cycle time. One operation cycle time is, for example, a time period taken to accomplish a procedure in which immediately after a discharge combination is determined in a combination process in a previous operation cycle, weighing hoppers 4 selected to make up of the discharge combination discharge the objects to be weighed, the objects to be weighed are subsequently fed to these weighing hoppers 4 making up of the discharge combination, time for stabilizing the weight sensors 41 lapses, these weight sensors 41 measure the weights of the objects to be weighed, and thereafter a combination process is performed using at least the measured values of these weighing hoppers 4 to determine a discharge combination. Therefore, one weighing cycle time Tw is equal to one operation cycle time in a case where an allowance time, a wait time, etc, which lapses from when a discharge combination is determined in a combination process until weighing hoppers 4 selected to make up of the discharge combination start to discharge the objects to be weighed are zero. FIG. 2 illustrates a case where the above described allowance time, wait time, etc are zero.

The double shift operation in the present embodiment is carried out in such a manner that a combination process is performed once in every Tw/2 time and weighing hoppers 4 making up of an optimal combination selected in the combination process discharge the objects to be weighed. The combination process in the double shift operation is performed in such a manner that combination calculation is performed using measured values (weight values of the objects to be weighed) of the weighing hoppers 4 holding the objects to be weighed whose weight values have been measured by the weight sensors 41, which are selected from among all the weighing hoppers 4, to thereby select one combination made up of weighing hoppers 4 in which a total measured value is within a specified weight range and to determine it as an optimal combination, and measured values of all the weighing hoppers 4 are used in combination calculation in two continuous combination processes. The weighing hoppers 4 making up of optimal combinations sequentially selected resulting from the combination processes repeated once in every Tw/2 time discharge the objects to be weighed alternately to the inner chute 6a and to the outer chute 6a or 6c for respective of the optimal combinations, and according to the discharge, the collecting hopper 7a and the collecting hopper 7b or 7c alternately discharge the objects to be weighed. Thereby, the objects to be weighed are fed to the packaging machine twice within one weighing cycle time Tw. In this case, one discharge cycle time Td1 for the combination weigher is equal to ½ of one weighing cycle time Tw. One discharge cycle time Td1 is equal to one packaging cycle time Tp1 for the packaging machine. Whereas the measured values of all the weighing hoppers 4 are used in combination calculation in two continuous combination processes, the measured values of all the weighing hoppers 4 are not necessarily used. For example, in cases where the total number of the weighing hoppers 4 is large, the measured values of all the weighing hoppers 4 are sometimes not used in combination calculation in two continuous combination processes, if the number of measured values used in one combination calculation is limited, that is, the number is predetermined.

Receiving, for example, a feed command signal from the packaging machine, as an input, the control unit 20 causes the inner chute collecting hopper 7a to opens its gate to discharge the objects to be weighed to the packaging machine in response to the feed command signal (time t1). And, the control unit 20 causes the weighing hoppers 4 selected to make up of the optimal combinations to open their inner gates 22 based on the operation timing of the gate of the collecting hopper 7a to discharge the objects to be weighed from the weighing hoppers 4 to the inner chute 6a (time t1). Receiving a subsequent feed command signal as an input, the control unit 20 causes the outer chute collecting hopper 7b or 7c to open its gate to discharge the objects o be weighed to the packaging machine in response to the feed command signal (time t2). And, the control unit 20 causes the weighing hoppers 4 selected to make up of the optimal combinations to open their outer gates 23 based on the operation timing of the gate of the collecting hopper 7b or 7c to discharge the objects to be weighed from the weighing hoppers 4 to the outer chute 6a or 6b (time t2). Then, receiving a subsequent feed command signal as an input, the control unit 20 causes the inner chute collecting hopper 7a to open its gate to discharge the objects to be weighed to the packaging machine in response to the feed command signal, and causes the weighing hoppers 4 selected to make up of the optimal combinations to open their inner gates 22 to discharge the objects to be weighed from the weighing hoppers 4 to the inner chute 6a (time t3). Thereafter, the similar operation is repeated.

In the operation shown in FIG. 2, the objects to be weighed which have been discharged from the weighing hoppers 4 by opening the inner gates 22 at time t1 are gathered to and held in the inner chute collecting hopper 7a before time t3, and the collecting hopper 7a opens its gate to discharge the objects to be weighed to the packaging machine at time t3. Likewise, the objects to be weighed which have been discharged from the weighing hoppers 4 by opening their outer gates 23 at time t2 are gathered to and held in the outer chute collecting hopper 7b or 7c before time t4, and the collecting hopper 7b or 7c opens its gate to discharge the objects to be weighed to the packaging machine at time t4.

As described above, the weighing hoppers 4 making up of the optimal combinations discharge the objects to be weighed to the inner chute 6a and to the outer chute 6b or 6c alternately, and according to the discharge, the inner chute collecting hopper 7a and the outer chute collecting hopper 7b or 7c alternately discharge the objects to be weighed to the packaging machine. Whereas in the operation of FIG. 2, the opening and closing timings of the gate of the collecting hopper 7a are the same as the opening and closing timings of the inner gates 22 of the weighing hoppers 4 and the opening and closing timings of the gate of the collecting hopper 7b or 7c are the same as the opening and closing timings of the outer gates 23 of the weighing hoppers 4, these are merely exemplary. For example, the control unit 20 may control the opening and closing timings of the gates 22 and 23 of the weighing hoppers 4 based on the opening and closing timings of the gates of the collecting hoppers 7a, 7b, and 7c to make the opening and closing timings of the gates different.

By causing the combination weigher to perform the double shift operation as described above, the combination weigher is able to discharge the objects to be weighed to the packaging machine once in every Tw/2 time at a speed twice as high as that of the single shift operation. This enables combination weigher to be adapted to the packaging machine operated at a high speed.

Subsequently, an operation of the combination weigher taking place when the combination weigher is configured to carry out a triple shift operation will be described in detail. In the triple shift operation, for example, the number of weighing hoppers 4 in each of the groups B and C may be set to nine so that the total number of weighing hoppers 4 is set to eighteen, and the number of the weighing hoppers 4 in each of the groups B and C which would be selected in the combination process may be set to four.

This makes it possible to achieve weighing precision substantially as high as that in the single shift operation carried out under the condition in which the total number of weighing hoppers 4 is ten and the number of weighing hoppers 4 which would be selected in the combination process is four.

Figure 3:
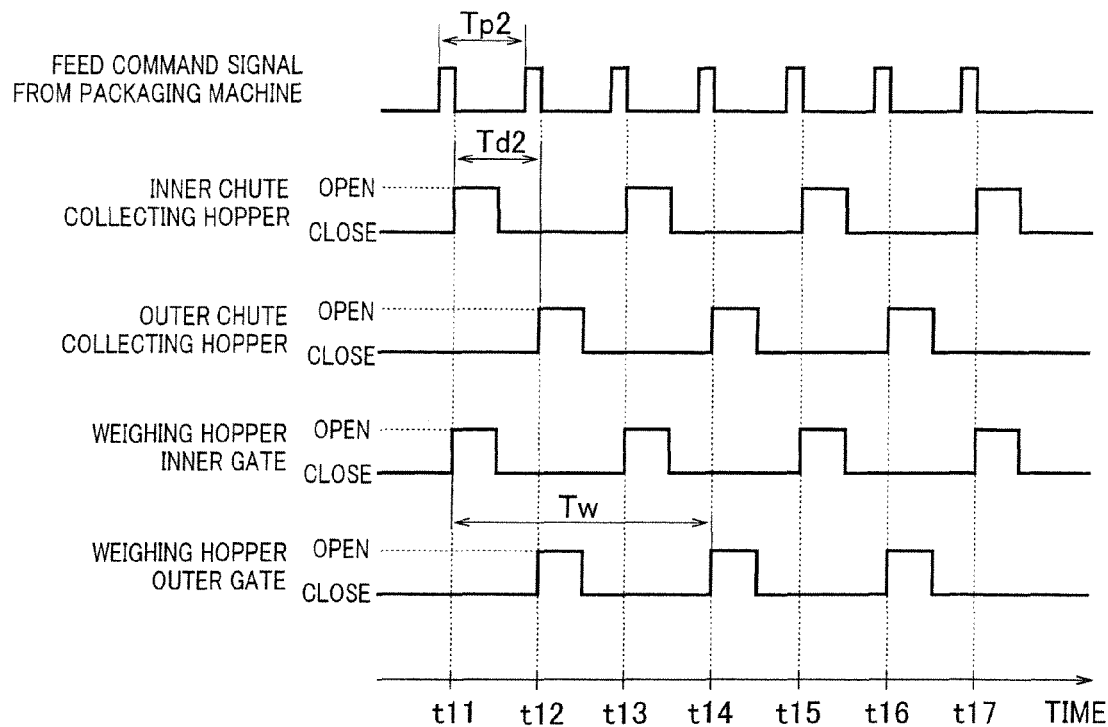
FIG. 3 is a timing chart showing a triple shift operation of the combination weigher of the embodiment 1 of the present invention.

FIG. 3 is a timing chart showing the triple shift operation carried out by the combination weigher according to the present embodiment. FIG. 3 illustrates an example in which one weighing cycle time Tw is equal to one operation cycle time, as in the example of FIG. 2.

The triple shift operation in the present embodiment is carried out in such a manner that a combination process is performed once in every Tw/3 time and the weighing hoppers 4 making up of an optimal combination selected in the combination process discharge the objects to be weighed. The combination process in the triple shift operation is performed in such a manner that combination calculation is carried out using measured values (weight values of the objects to be weighed) of the weighing hoppers 4 holding the objects to be weighed whose weight values have been measured by the weight sensors 41, which are selected from among all the weighing hoppers 4 to select one combination made up of the weighing hoppers 4 in which a total measured value is within a predetermined weight range and to determine it as an optimal combination, and measured values of all the weighing hopper 4 are used in combination calculation in three continuous combination processes. The weighing hoppers 4 making up of optimal combinations sequentially selected resulting from repetitive combination processes performed once in every Tw/3 time discharge the objects to be weighed alternately to the inner chute 6a and to the outer chute 6b or 6c for respective of the optimal combinations, and according to the discharge, the collecting hopper 7a and the collecting hopper 7b or 7c alternately discharge the objects to be weighed. Thereby, the objects to be weighed are discharged to the packaging machine three times within one weighing cycle time Tw. In this case, one discharge cycle time Td2 for the combination weigher is equal to ⅓ of one weighing cycle time Tw. One discharge cycle time Td2 is equal to one packaging cycle time Tp2 of the packaging machine. Whereas the measured values of all the weighing hoppers 4 are used in combination calculation in three continuous combination processes, the measured values of all the weighing hoppers 4 are not necessarily used. For example, in cases where the total number of the weighing hoppers 4 is large, the measured values of all the combination hoppers 4 are sometimes not used in combination calculation in continuous three combination processes, if the number of measured values used in one combination calculation is limited, that is, the number is predetermined.

Receiving, for example, a feed command signal from the packaging machine, as an input, the control unit 20 causes the inner chute collecting hopper 7a to open its gate to discharge the objects to be weighed to the packaging machine in response to the feed command signal (time t11). And, the control unit 20 causes the weighing hoppers 4 selected to make up of the optimal combinations to open their inner gates 22 based on the operation timing of the gate of the collecting hopper 7a to discharge the objects to be weighed to the inner chute 6a (time t11). Receiving a subsequent feed command signal as an input, the control unit 20 causes the outer chute collecting hopper 7b or 7c to open its gate to discharge the objects to be weighed to the packaging machine in response to the feed command signal (time t12). And, the control unit 20 causes the weighing hoppers 4 selected to make up of the optimal combinations to open their outer gates 23 based on the operation timing of the gate of the collecting hopper 7b or 7c to discharge the objects to be weighed to the outer chute 6b or 6c (time t12). Then, receiving a subsequent feed command signal as an input, the control unit 20 causes the inner chute collecting hopper 7a to open its gate to discharge the objects to be weighed to the packaging machine, and causes the weighing hoppers 4 selected to make up of the optimal combinations to open their inner gates 22 to discharge the objects to be weighed to the inner chute 6a, in response to the feed command signal (time t13). Thereafter, the similar operation is repeated.

In the operation shown in FIG. 3, the objects to be weighed which have been discharged from the weighing hoppers 4 by opening their inner gates 22 at time t11 are gathered to and held in the inner chute collecting hopper 7a before time t13, and the collecting hopper 7a opens its gate to discharge the objects to be weighed to the packaging machine at time t13. Likewise, the objects to be weighed which have been discharged from the weighing hoppers 4 by opening the outer gates 23 at time t12 are gathered to and held in the outer chute collecting hopper 7b or 7c before time t14, and the collecting hopper 7b or 7c opens its gate to discharge the objects to be weighed to the packaging machine at time t14.

As described above, the weighing hoppers 4 selected to make up of the optimal combinations every time combination calculation is performed, discharge the objects to be weighed to the inner chute 6a and to the outer chute 6b or 6c alternately, and according to the discharge, the inner chute collecting hopper 7a and the outer chute collecting hopper 7b or 7c alternately discharge the objects to be weighed to the packaging machine. Whereas in the operation of FIG. 3, the opening and closing timings of the gate of the collecting hopper 7a are the same as the opening and closing timings of the inner gates 22 of the weighing hoppers 4 and the opening and closing timings of the gate of the collecting hopper 7b or 7c are the same as the opening and closing timings of the outer gates 23 of the weighing hoppers 4, these are merely exemplary. For example, the control unit 20 may control the opening and closing timings of the gates 22 and 23 of the weighing hoppers 4 based on the opening and closing timings of the gates of the collecting hopper 7a, 7b, and 7c to make the opening and closing timings of the gates different.

By causing the combination weigher to perform the triple shift operation as described above, the combination weigher discharges the objects to be weighed to the packaging machine once in every Tw/3 time at a speed three times as high as that of the single shift operation. This makes it possible to adapt the combination weigher to the packaging machine operated at a high speed.

Since in the example 1, the plurality of outer chutes 6b and 6c are disposed to surround the opening at the upper part of the inner chute 6a, a structure is relatively simple, and distances over which the objects to be weighed which have been discharged from the weighing hoppers 4 to the outer chute 6b or 6c are transferred to the collecting hopper 7b or 7c can be made short and substantially equal irrespective of the locations of the weighing hoppers 4, and all of the objects to be weighed which have been discharged from the weighing hoppers 4 to the outer chute 6b or 6c can be gathered to the associated collecting hopper 7b or 7c in a short time irrespective of characteristics of almost all the objects to be weighed. In addition, since the collecting hopper 7a is provided at the discharge outlet 6ae at a center of the bottom part of the inner chute 6a, distances between the weighing hoppers 4 and the collecting hopper 7a are made substantially made equal, and all the objects to be weighed which have been discharged from the weighing hopper 4 to the inner chute 6a can be gathered to the collecting hopper 7a in a short time irrespective of characteristics of almost all the objects to be weighed. As described above, a structure of the collecting chutes (inner chute and outer chute) can be made simple, and a time taken to transfer objects to be weighed on the collecting chute can be reduced, irrespective of characteristics of almost all objects to be weighed, thereby enabling a high-speed operation. Also, the above described double shift operation or triple shift operation can increase a productivity within a specified time. Furthermore, combination weighing precision does not degrade, because an event that the measured values of specified weighing hoppers 4 are not used to determine optimal combinations for discharging the objects to be weighed to the outer chute 6b or 6c, does not take place.

In the first example, the size of the outer chute collecting hoppers 7b and 7c can be reduced, by configuring the setting in the combination process so that at least one weighing hopper 4 is selected from each of the groups B and C respectively corresponding to the outer chutes 6b and 6c to make up of the optimal combination or a maximum number of the weighing hoppers 4 selected from each of the groups B and C is limited to less than the number of the weighing hoppers 4 which would be selected. For example, when four weighing hoppers 4 are selected to make up of the optimal combination (when the number of weighing hoppers 4 which would be selected is four), combination calculation is performed under a condition in which at least one weighing hopper 4 is selected from each of the groups B and C, or a maximum number of the weighing hoppers 4 which are selected from each of the groups B and C is three. If such a condition is not set, then the outer chute collecting hoppers 7b and 7c are each required to have a volume for accommodating the objects to be weighed which have been discharged from the four weighing hoppers 4, as in the inner chute collecting hopper 7a. However, if the condition is set, the number of weighing hoppers 4 which discharge the objects to be weighed to the outer chute 6b or 6c is three at maximum, and therefore, the outer chute collecting hoppers 7b and 7c may be formed to have a volume for accommodating the objects to be weighed from the three weighing hoppers 4. In other words, by determining the optimal combinations so that the objects to be weighed inside the weighing hoppers 4 making up of optimal combinations for discharging the objects to be weighed to the outer chutes are always discharged to the two outer chutes 6b and 6c, the size of the collecting hoppers 7b and 7c can be reduced. This advantage is achieved by setting the above described condition at least in the combination process for determining the discharge combination (optimal combination) for discharging the objects to be weighed to the outer chute 6b or 6c. By setting the same condition in the combination process for determining the discharge combination (optimal combination) for discharging the objects to be weighed to the inner chute 6a, the combination process can be carried out in a common method. In addition, a difference in the number of weighing hoppers 4 between the groups B and C which can be used for combination calculation is made smaller, and combination weighing precision is not reduced when determining the discharge combination for discharging the objects to be weighed to the outer chute 6b or 6c.

Example 2

Figure 4:
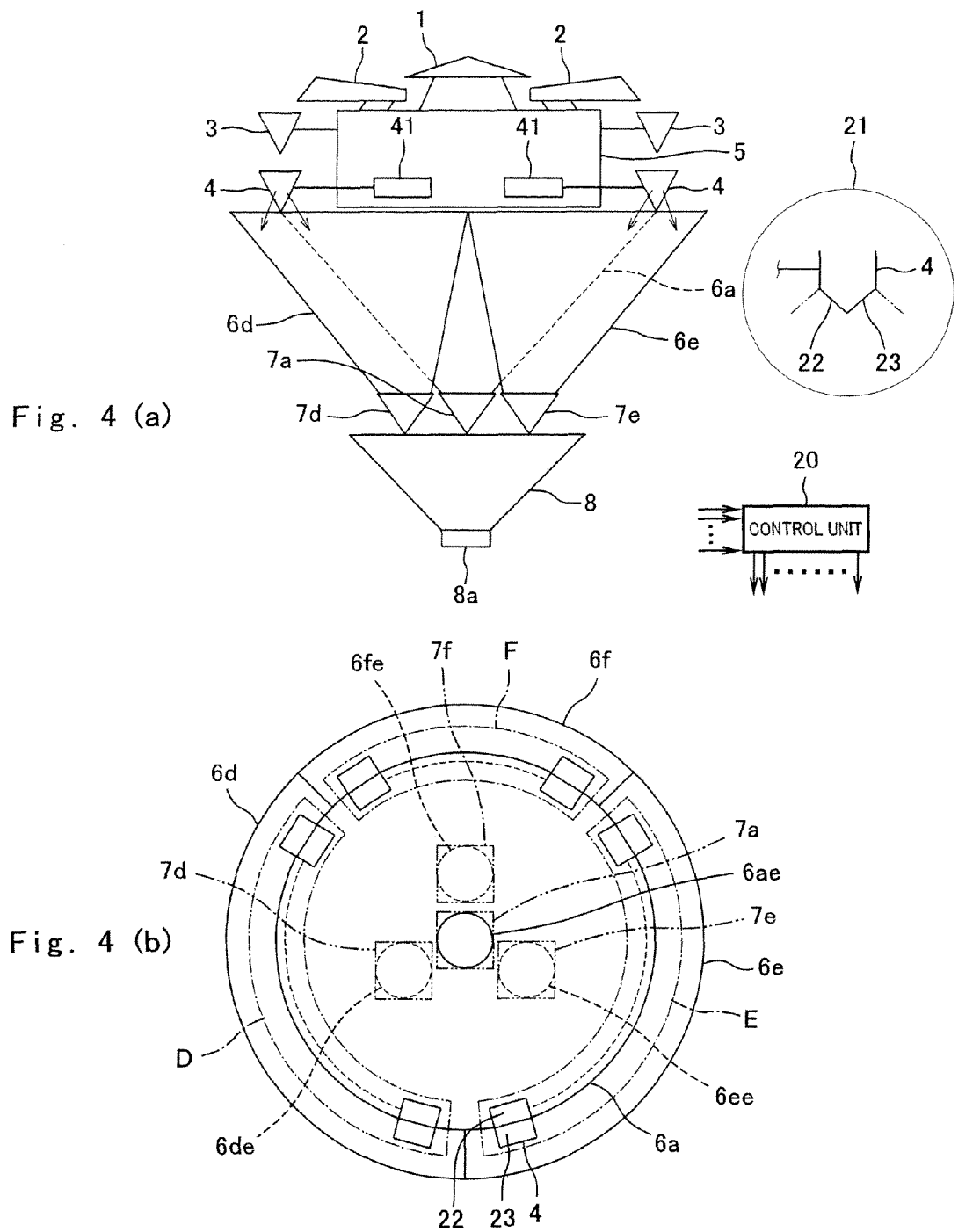
FIG. 4 (a) is a schematic partial cross-sectional view of a combination weigher according an example 2 of the embodiment 1 of the present invention, as viewed from laterally.

FIG. 4 (a) is a schematic partial cross-sectional view of a combination weigher according an example 2 of the embodiment 1 of the present invention, as viewed from laterally, and FIG. 4(b) is a schematic view of collecting chutes (inner chute and three outer chutes) and weighing hoppers of the combination weigher as viewed from above.

In the example 1 shown in FIG. 1, the outer chute consists of two parts, while in the present example, the outer chute consists of three parts. So, collecting hoppers 7d, 7e, and 7f are respectively provided at discharge outlets 6de, 6ee, and 6fe at bottom parts of the three outer chutes 6d, 6e, and 6f, to hold and discharge the objects to be weighed. In FIG. 4(a), the outer chute 6f and the collecting hopper 7f are located on back side of the inner chute 6a and the collecting hopper 7a and therefore are invisible. The other configuration is identical to that of the example 1, and will not be further described.

The example 2 may be configured as in the example 1 when the double shift operation and the triple shift operation are carried out. In the configuration for the double shift operation, for example, the number of weighing hoppers 4 in each of groups D and E respectively corresponding to the outer chutes 6d and 6e may be set to five, the number of weighing hoppers 4 in a group F corresponding to the outer chute 6f may be set to four so that the total number of weighing hoppers 4 may be set to fourteen, and the number of weighing hoppers 4 which would be selected in the combination process may be set to four. Alternatively, the number of weighing hoppers 4 in the group F may be set to five equal to the number of weighing hoppers 4 in each of the groups D and E so that the total number of the weighing hoppers 4 may be set to fifteen. The timing chart in the case of carrying out the double shift operation is identical to that of FIG. 2. The control unit 20 causes the outer chute collecting hopper 7d, 7e or 7f to open and close its gate at the same timings as the outer chute collecting hopper 7b or 7c in FIG. 1.

In the configuration for causing the triple shift operation, for example, the number of weighing hoppers 4 in each of the groups D, E and F may be set to six so that the total number of weighing hoppers 4 may be set to eighteen, and the number of weighing hoppers 4 which would be selected in the combination process may be set to four. The timing chart in the case of carrying out the triple shift operation is identical to that of FIG. 3. The control unit 20 causes the outer chute collecting hopper 7d, 7e or 7f to open and close its gate at the same timings as the outer chute collecting hopper 7b or 7c in FIG. 1.

In the example 2, the number of parts of the outer chute is different from that of the example 1, but the same advantages as those of the example 1 are achieved.

As in the example 1, in the example 2, the size of the outer chute collecting hoppers 7d, 7e, and 7f can be reduced, by configuring the setting in the combination process so that at least one weighing hopper 4 is selected from two or more of the groups D, E, and F (in this case, two groups or all of the three groups) of the weighing hoppers 4 respectively corresponding to the outer chutes 6d, 6e, and 6f to make up of the optimal combination, or a maximum number of the weighing hoppers 4 selected from each of the groups D, E, and F is limited to less than the number of weighing hoppers 4 which would be selected.

Whereas the configuration in which the outer chute consists of two parts has been described in the example 1 and the configuration in which the outer chute consists of three parts has been described in the example 2, the outer chute may be configured to consist of four or more parts in the same manner.

Whereas the configuration for carrying out the double shift operation and the configuration for carrying out the triple shift operation have been described in the embodiment 1, the configuration for carrying out the single shift operation which is slow in speed (discharge speed) may be used, as a matter of course. In the configuration for carrying out the single shift operation, for example, the total number of weighing hoppers 4 is set to ten, the number of weighing hoppers 4 which would be selected in a combination process is set to four, the combination calculation is performed once within one weighing cycle time Tw, the weighing hoppers 4 discharge the objects to be weighed once within one weighing cycle time Tw, and the collecting hopper discharges the objects to be weighed to the packaging machine once within one weighing cycle time Tw. In this case, one discharge cycle time for the combination wiegher is equal to the one weighing cycle time Tw. In this case, also, weighing hoppers 4 selected to make up of optimal combinations are configured to discharge the objects to be weighed alternately to the inner chute and to the outer chute, every time combination calculation is performed.

In the present embodiment, provided that all the objects to be weighed which have been discharged from the weighing hoppers 4 slide down on the collecting chutes (inner chute and outer chute) in a short time, and the packaging operation of the packaging machine is not impeded, the collecting hoppers 7a, 7b, and 7c may be omitted. In this case, configuration is simplified because of the omission of the collecting hoppers, and so, control therefor is unnecessary. The control unit 20 may cause weighing hoppers 4 selected to make up of an optimal combination to discharge the objects to be weighed in response to, for example, a feed command signal from the packaging machine. For example, in the configuration of FIG. 1, the objects to be weighed which have been discharged from the weighing hoppers 4 may be discharged to the lower chute 8 directly from the discharge outlets 6ae, 6be, or 6ce of the collecting chute 6a, 6b or 6c, respectively.

Embodiment 2

Figure 5:
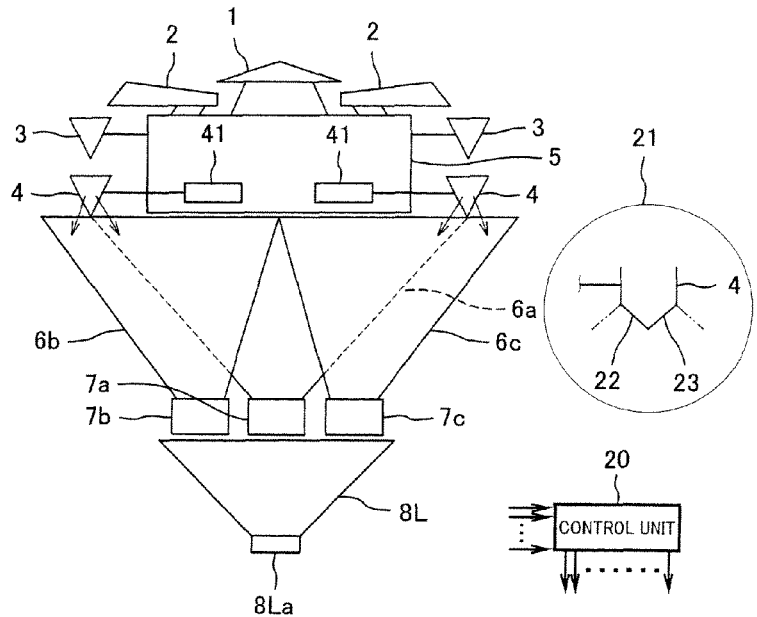
FIG. 5 (a) is a schematic partial cross-sectional view of a combination weigher according to an embodiment 2 of the present invention, as viewed from laterally.
Figure 5:
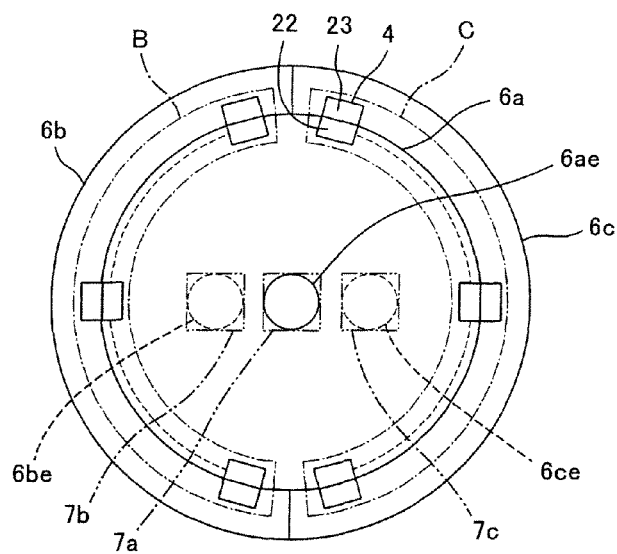
Figure 5:
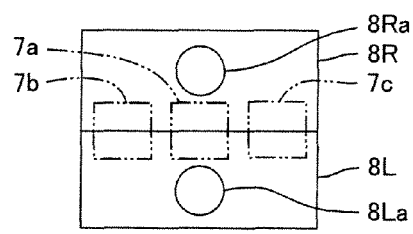

FIG. 5 (a) is a schematic partial cross-sectional view of a combination weigher according to an embodiment 2 of the present invention, as viewed from laterally, and FIG. 5(b) is a schematic view of collecting chutes (inner chute and two outer chutes) and weighing hoppers of the combination weigher as viewed from above, and FIG. 5(c) is a schematic view of two lower chutes of the combination weigher as viewed from above.

As shown in FIG. 5(c), in the combination weigher of the present embodiment, two lower chutes 8L and 8R are disposed below the three collecting hoppers 7a, 7b, and 7c. The collecting hopper 7a is provided with a gate (not shown) to be able to discharge the objects to be weighed to the lower chute 8L, while the collecting hoppers 7b and 7c are provided with gates (not shown) to be able to discharge the objects to be weighed to the lower chute 8R. The lower chute 8L serves to transfer the objects to be weighed which have been discharged from the collecting hopper 7a and to discharge them from a discharge outlet 8La at a bottom part thereof. The lower chute 8R serves to transfer the objects to be weighed which have been discharged from the collecting hopper 7b or 7c and to discharge them from a discharge outlet 8Ra at a bottom part thereof. The other configuration is identical to that of the example 1 of the embodiment 1 shown in FIG. 1, and will not be further described. It should be noted that the combination process performed by the control unit 20 and the operation timing are different from those of the embodiment 1.

Below the lower chutes 8L and 8R of the combination weigher, two packaging machines or a twin type packaging machine having two inlets for the objects to be weighed are/is disposed. The objects to be weighed which have been discharged from the discharge outlet 8La of the lower chute 8L and the discharge outlet 8Ra of the lower chute 8R are fed into the inlets of the associated packaging machines (first and second packaging machine inlets), and are charged into package bags in the packaging machine for packaging. In the present embodiment, the objects to be weighed which have been discharged from the collecting hopper 7a are fed into the first packaging machine inlet and the objects to be weighed which have been discharged from the collecting hoppers 7b and 7c are fed into the second packaging machine inlet.

Whereas in the present embodiment, the two lower chutes 8L and 8R are provided to respectively correspond to the two packaging machine inlets, the collecting hopper 7a may be configured to be able to discharge the objects to be weighed only to the lower chute 8L and the collecting hoppers 7b and 7c may be configured to be able to discharge the objects to be weighed only to the lower chute 8R. Therefore, the discharge gates of the collecting hoppers 7a, 7b, and 7c have a simple structure.

The control unit 20 includes a control means and a combination calculation means to control the operation of the entire combination weigher and to perform a combination process to determine a combination made up of weighing hoppers 4 which will discharge the objects to be weighed. In the combination process, the combination calculation is performed based on measured values (measured values of the objects to be weighed inside the weighing hoppers 4, which are obtained using the weight sensors 41) of the weighing hopper 4 to determine two combinations each made up of the weighing hoppers 4 in which a combination weight value which is a total of the measured values is within an allowable range (predetermined weight range) with respect to a target weight value, to determine them as discharge combinations. This combination process will be described in detail later.

An outline of the operation of the combination weigher configured as described above will be first described.

The objects to be weighed are supplied from the external supplying device to the dispersion feeder 1. The dispersion feeder 1 feeds the objects to be weighed to the feeding hopper 3 through the linear feeder 2. The feeding hopper 3 feeds the objects to be weighed to the weighing hopper 4. The weight sensor 41 measures the weight of the objects to be weighed which have been fed into the weighing hopper 4, and sends the measured value to the control unit 20. Then, the control unit 20 performs the above described combination process to determine two discharge combinations simultaneously. The weighing hoppers 4 selected to make up of the two discharge combinations discharge the objects to be weighed simultaneously. The feeding hopper 3 feeds the objects to be weighed to the weighing hoppers 4 which are empty. The linear feeder 2 feeds the objects to be weighed to the feeding hopper 3 which is empty.

In the above configuration, the weighing hoppers 4 making up of the two discharge combinations determined simultaneously in a combination process discharge the objects to be weighed in different directions. To be specific, the weighing hoppers 4 making up of one of the two discharge combinations discharge the objects to be weighed to the inner chute 6a, while the weighing hoppers 4 making up of the other discharge combination discharge the objects to be weighed to the outer chute 6b or 6c. Also, the inner chute collecting hopper 7a and the outer chute collecting hopper 7b or 7c discharge the objects to be weighed simultaneously.

Figure 6:
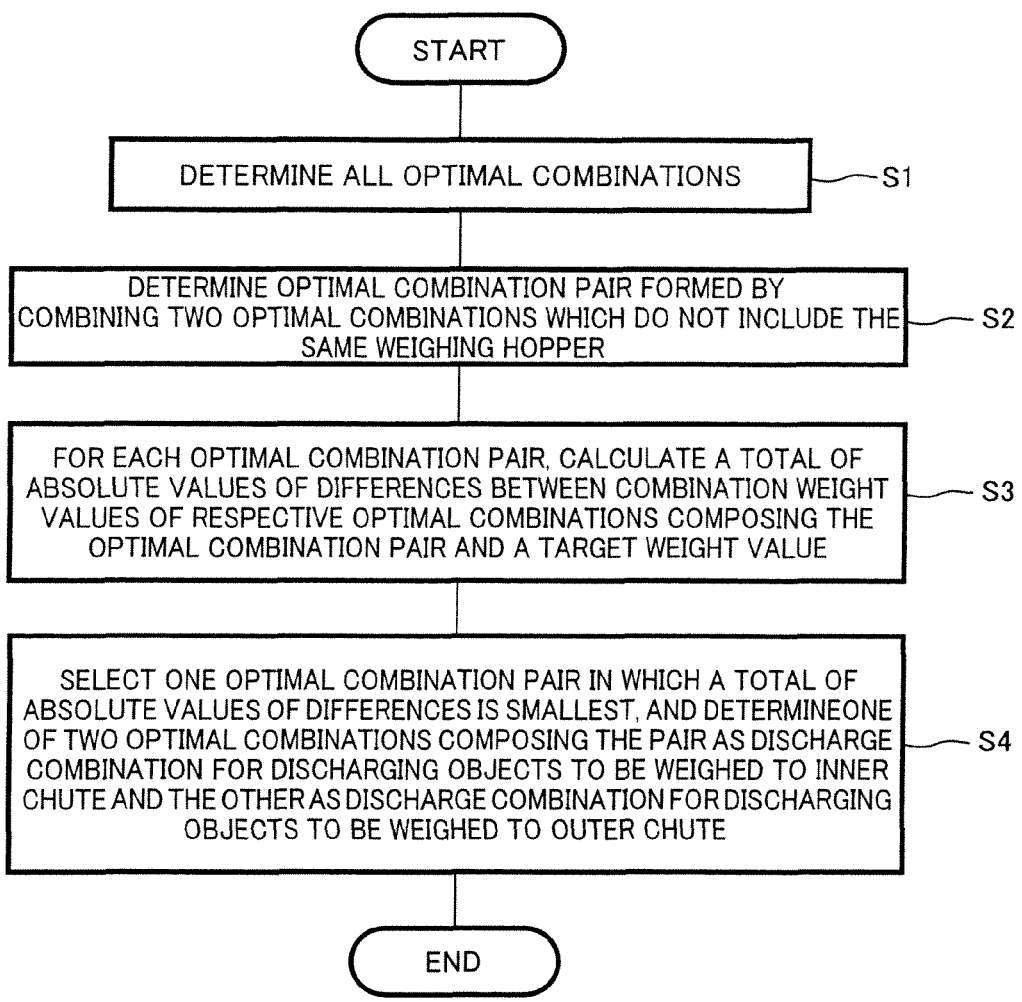
FIG. 6 is a flowchart showing a procedure of a first combination process in the combination weigher according to the embodiment 2 of the present invention.

Subsequently, the combination process in the present embodiment will be described in detail. FIG. 6 is a flowchart showing the combination process in the present embodiment.

In step S1, combination calculation is performed using measured values (weight values) of the objects to be weighed of weighing hoppers 4 holding the objects to be weighed whose weight values have been measured by the weight sensors 41 to determine all combinations in which combination weight values which are total measured values are within an allowable range with respect to a target weight value and determine them as optimal combinations.

In step S2, an optimal combination pair formed by combining two optimal combinations which do not include the same weighing hopper 4 is determined.

In step S3, for each optimal combination pair, an absolute value of a difference between a combination weight value of each of the optimal combinations forming the optimal combination pair and the target weight value is calculated, and a total of absolute values of differences is calculated. The absolute value of the difference between the combination weight value and the target weight value is an absolute value of a value obtained by subtracting the target weight value from the combination weight value, or an absolute value of a value obtained by subtracting the combination weight value from the target weight value, and is zero or a positive value.

In step S4, one optimal combination pair in which the total of the absolute values of the differences calculated in step S3 is smallest is selected, one of the two optimal combinations forming the selected pair is determined as a discharge combination (first discharge combination) for discharging the objects to be weighed to the inner chute 6a, and the other optimal combination is determined as a discharge combination (second discharge combination) for discharging the objects to be weighed to the outer chute 6b or 6c. A determination method of the first discharge combination and the second discharge combination is predetermined and any method may be used. For example, serial numbers may be assigned to the weighing hoppers 4, an optimal combination including a weighing hopper 4 with a smallest number may be determined as the first discharge combination, and the other optimal combination may be determined as the second discharge combination, or vice versa. Alternatively, the first and second optimal combinations may be determined according to the magnitude of the combination weight value. For example, an optimal combination with a larger combination weight value may be determined as the first discharge combination and an optimal combination with a smaller combination weight value may be determined as the second discharge combination, or vice versa. In a further alternative, the optimal combination with the larger combination weight value and the optimal combination with the smaller combination weight value may be alternately determined as the first and second discharge combinations, every time combination process is performed.

Whereas in steps S3 and S4, for each optimal combination pair, the total of the absolute values of the differences between the combination weight values of the respective optimal combinations and the target weight value may be calculated, and one optimal combination pair in which the total of the absolute values of the differences is smallest is selected to determine the two discharge combinations, the total of squares of the absolute values of the differences between the combination weight values of the respective optimal combinations and the target weight value, may be calculated, and an optimal combination pair in which a total of the squares of the differences is smallest may be selected to determine it as two discharge combinations, for each optimal combination pair.

Figure 7:
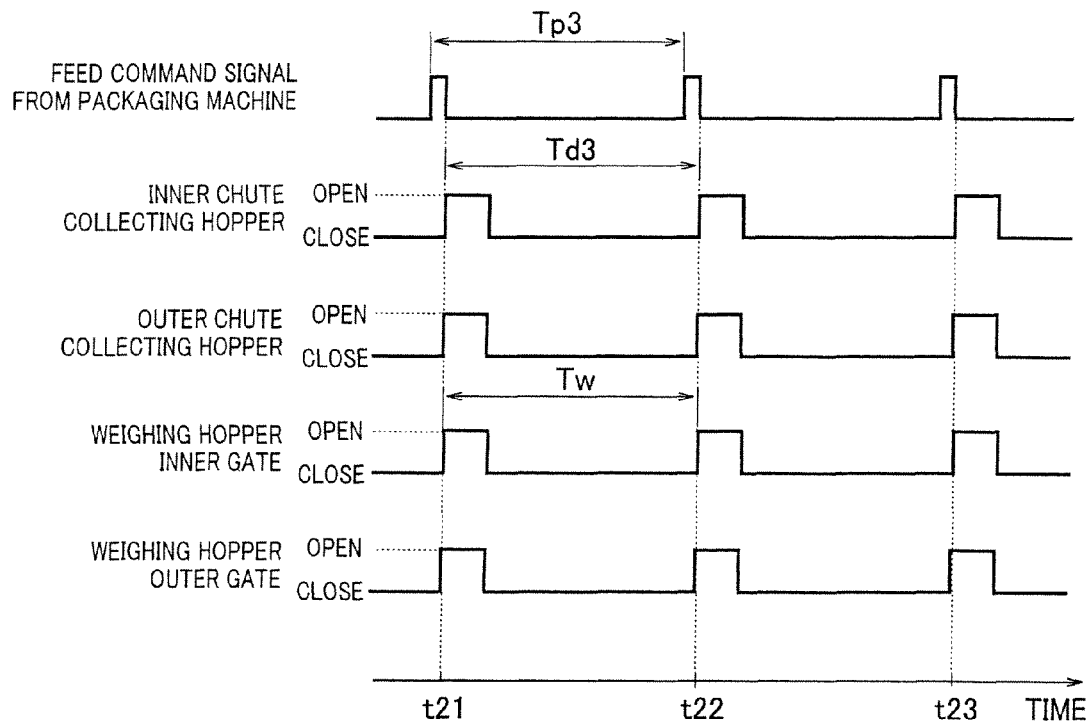
FIG. 7 is a timing chart showing a first operation example of the combination weigher according to the embodiment 2 of the present invention.

As described above, two discharge combinations are determined in one combination process. FIG. 7 is a timing chart showing a first operation example of the combination weigher of the present embodiment. In the example in FIG. 7, as in the example in FIG. 2, one weighing cycle time Tw is equal to one operation cycle time. It should be noted that two discharge combinations are determined in one combination process and the two discharge combinations discharge the objects to be weighed simultaneously.

In the first operation example of the present embodiment, combination process is performed to determine two discharge combinations simultaneously once in every Tw time and weighing hoppers 4 making up of the two discharge combinations determined in the combination process discharge the objects to be weighed simultaneously once in every Tw time. Also, the collecting hopper 7a and the collecting hopper 7b or 7c discharge the objects to be weighed simultaneously once in every Tw time. Thereby, the objects to be weighed corresponding to the two discharge combinations are fed into the packaging machine within one weighing cycle time Tw. In this case, one discharge cycle time Td3 of the combination weigher is equal to one weighing cycle time Tw. Also, the one discharge cycle time Td3 is equal to one packaging cycle time Tp3 of the packaging machine. In this case, by configuring the setting so that the number of weighing hoppers 4 in each of the groups B and C is set to seven so that the total number of weighing hoppers is set to fourteen, and the number of weighing hoppers 4 which would be selected to make up of one optimal combination is set to four, as in the double shift operation in the example 1 of the embodiment 1, for example, higher combination weighing precision is achieved.

Receiving, for example, a feed command signal from the packaging machine, as an input, the control unit 20 causes the inner chute collecting hopper 7a and the outer chute collecting hopper 7b or 7c to open their gates simultaneously to discharge the objects to be weighed to the packaging machine, in response to the feed command signal (time t21). And, the control unit 20 causes the weighing hoppers 4 selected to make up of one of the discharge combinations to open their inner gates 22 based on the operation timings of the gates of the collecting hoppers 7a and, 7b, or 7c to discharge the objects to be weighed to the inner chute 6a, and at the same time, causes the weighing hoppers 4 selected to make up of the other discharge combination to open their outer gates 23 to discharge the objects to be weighed to the outer chute 6b or 6c (time t21). The above operation is repeated every time the feed command signal is received as the input (time t22, time t23).

In the operation shown in FIG. 7, the objects to be weighed which have been discharged from the weighing hoppers 4 by opening the inner gates 22 at time t21 are gathered to and held in the inner chute collecting hopper 7a before time t22, and the collecting hopper 7a opens its gate to discharge the objects to be weighed to the packaging machine through the lower chute 8L at time t22. Likewise, the objects to be weighed which have been discharged from the weighing hoppers 4 by opening the outer gates 23 at time t21 are gathered to and held in the outer chute collecting hopper 7b or 7c before time t22, and the collecting hopper 7b or 7c opens its gate to discharge the objects to be weighed to the packaging machine through the lower chute 8R at time t22.

Whereas in the operation of FIG. 7, the opening and closing timings of the gates of the collecting hoppers 7a, 7b and or 7c are the same as the opening and closing timings of the inner gate 22 and the outer gate 23 of the weighing hopper 4, these are merely exemplary. For example, the control unit 20 may control the opening and closing timings of the inner gate 22 and the outer gate 23 of the weighing hopper 4 based on the opening and closing timings of the gates of the collecting hoppers 7a, 7b, or 7c to make the opening and closing timings of the gates different between the collecting hoppers 7a, and 7b or 7c and the weighing hoppers 4.

By causing the combination weigher to operate in the manner as described above, the objects to be weighed are discharged to each of the two packaging machine inlets once in every weighing cycle time. As a result, a productivity (total number of times the combination weigher discharges the objects to be weighed to the packaging machine) within a specified time period can be improved.

Figure 8:
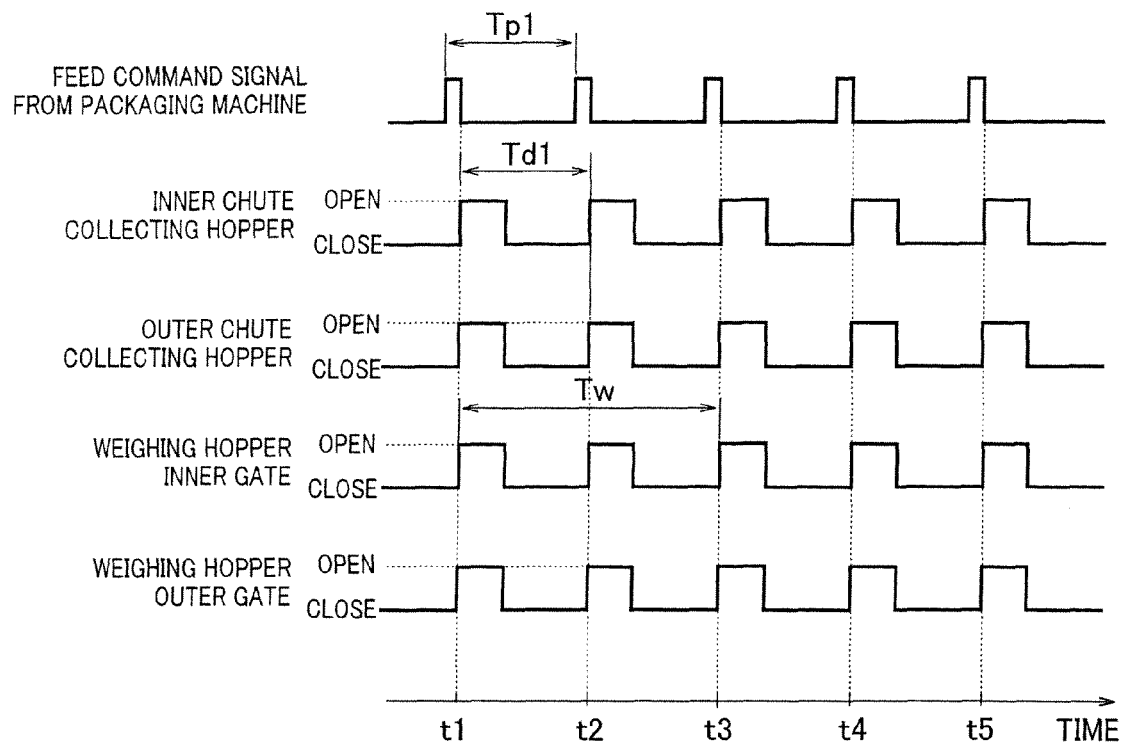
FIG. 8 is a timing chart showing a second operation example of the combination weigher according to the embodiment 2 of the present invention.

FIG. 8 is a timing chart showing a second operation example of the combination weigher of the present embodiment. In the example in FIG. 8, as in the example in FIG. 2, one weighing cycle time Tw is equal to one operation cycle time. It should be noted that two discharge combinations are determined in one combination process and the two discharge combinations discharge the objects to be weighed simultaneously.

In the second operation example of the present embodiment, combination process is performed to determine two discharge combinations simultaneously once in every Tw/2 time and weighing hoppers 4 making up of the two discharge combinations determined in the combination process discharge the objects to be weighed simultaneously once in every Tw/2 time. Also, the collecting hopper 7a and the collecting hopper 7b or 7c discharge the objects to be weighed simultaneously once in every Tw/2 time. Thereby, the objects to be weighed corresponding to the two discharge combinations are fed into the packaging machine twice within one weighing cycle time Tw. In this case, one discharge cycle time Td1 for the combination weigher is equal to ½ of one weighing cycle time Tw. Also, the one discharge cycle time Td1 is equal to one packaging cycle time Tp1 of the packaging machine. In this case, by configuring the setting so that the number of weighing hoppers 4 in each of the groups B and C is set to eleven so that the total number of weighing hoppers 4 is set to twenty two, and the number of weighing hoppers 4 which would be selected to make up of one optimal combination is set to four, higher combination weighing precision is achieved.

Receiving, for example, a feed command signal from the packaging machine, as an input, the control unit 20 causes the inner chute collecting hopper 7a and the outer chute collecting hopper 7b or 7c to open their gates simultaneously to discharge the objects to be weighed to the packaging machine, in response to the feed command signal (time t1). And, the control unit 20 causes the weighing hoppers 4 selected to make up of one of the discharge combinations to open their inner gates 22 based on the operation timings of the gates of the collecting hoppers 7a and, 7b, or 7c to discharge the objects to be weighed to the inner chute 6a and causes the weighing hoppers 4 selected to make up of the other discharge combination to open their outer gates 23 based on the operation timings of the gates of the collecting hoppers 7a and 7b or 7c to discharge the objects to be weighed to the outer chute 6b or 6c (time t1). The above operation is repeated every time the feed command signal is received as the input (time t2, time t3, . . . ).

In the operation shown in FIG. 8, the objects to be weighed which have been discharged from the weighing hoppers 4 by opening the inner gates 22 at time t1 are gathered to and held in the inner chute collecting hopper 7a before time t2, and the collecting hopper 7a opens its gate to discharge the objects to be weighed to the packaging machine at time t2. Likewise, the objects to be weighed which have been discharged from the weighing hoppers 4 by opening the outer gates 23 at time t1 are gathered to and held in the outer chute collecting hopper 7b or 7c before time t2, and the collecting hopper 7b or 7c opens its gate to discharge the objects to be weighed to the packaging machine at time t2.

Whereas in the operation of FIG. 8, the opening and closing timings of the gates of the collecting hoppers 7a and 7b or 7c are the same as the opening and closing timings of the inner gate 22 and the outer gate 23 of the weighing hopper 4, these are merely exemplary. For example, the control unit 20 may control the opening and closing timings of the inner gate 22 and the outer gate 23 of the weighing hopper 4 based on the opening and closing timings of the gates of the collecting hoppers 7a and 7b or 7c to make the opening and closing timings of the gates different between the collecting hoppers 7a and 7b or 7c and the weighing hoppers 4.

By causing the combination weigher to operate in the manner as described above, the objects to be weighed are discharged to each of the two packaging machine inlets once in every Tw/2 time. As a result, a productivity within a specified time period can be improved, and the combination weigher can be adapted to, for example, a twin-type packaging machine operated at a high speed.

Also, the combination process may be performed once in every Tw/3 time using measured values of the weighing hoppers 4 holding the objects to be weighed whose weight values have been measured by the weight sensors 41, to determine two discharge combinations simultaneously. And, the weighing hoppers 4 making up of the two discharge combinations determined in the combination process discharge the objects to be weighed simultaneously once in every Tw/3 time. Correspondingly, the collecting hopper 7a and the collecting hopper 7b may be configured to discharge the objects to be weighed simultaneously once in every Tw/3 time. In this case, the objects to be weighed are discharged to each of the two packaging machine inlets once in every Tw/3 time. As a result, a productivity within a specified time period can be further improved, and the combination weigher can be adapted to, for example, the twin-type packaging machine operated at a higher speed.

Since in the present embodiment, the plurality of outer chutes 6b and 6c are disposed to surround the opening at the upper part of the inner chute 6a, as in the embodiment 1, a structure of them is relatively simple, and distances over which the objects to be weighed which have been discharged from the weighing hoppers 4 to the outer chute 6b or 6c are transferred to the collecting hopper 7b or 7c can be made short and substantially equal irrespective of the location of the weighing hoppers 4, and all of the objects to be weighed which have been discharged from the weighing hoppers 4 to the outer chute 6b or 6c can be gathered to the associated collecting hopper 7b or 7c in a short time irrespective of characteristics of almost the objects to be weighed. In addition, since the collecting hopper 7a is provided at the discharge outlet 6ae at a center of the bottom part of the inner chute 6a, distances between the weighing hoppers 4 and the collecting hopper 7a are made substantially equal, and all the objects to be weighed which have been discharged from the weighing hoppers 4 to the inner chute 6a can be gathered to the collecting hopper 7a in a short time irrespective of characteristics of almost the objects to be weighed. As described above, a structure of the collecting chutes (inner chute and outer chute) can be simplified, and a time taken to transfer the objects to be weighed on the collecting chute can be reduced, irrespective of characteristics of almost all objects to be weighed, thereby enabling a high-speed operation. Also, since the objects to be weighed belonging to the two discharge combinations are discharged simultaneously once in every Tw time, once in every Tw/2 time, or once in every Tw/3 time as described above, a productivity within a specified time can be improved. Furthermore, when the optimal combination for discharging the objects to be weighed to the outer chute 6b or 6c is determined, the event that the measured value of a specified weighing hopper 4 is not used does not occur. As a result, combination weighing precision does not degrade.

In the combination process (first combination process) shown in the flowchart of FIG. 6, the optimal combination pair in which the total of absolute values of differences between combination weight values of the respective optimal combinations and the target weight value is smallest is selected, and the two optimal combinations included in that optimal combination pair are determined as discharge combinations. Therefore, combination weighing precision for the objects to be weighed to be discharged can be improved as a whole.

The first combination process shown in the flowchart of FIG. 6 may be replaced by a second combination process or a third combination process as described below.

Figure 9:
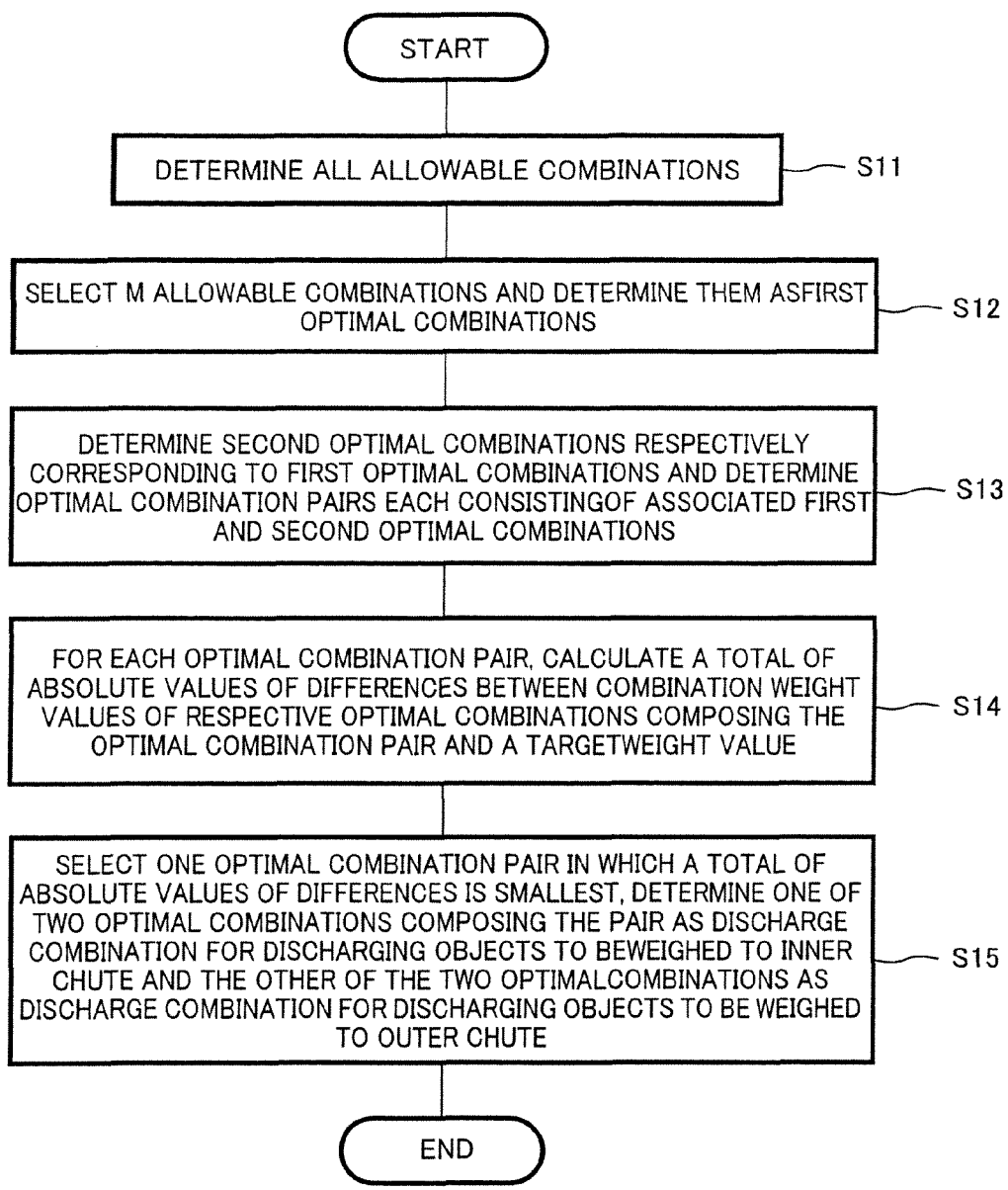
FIG. 9 is a flowchart showing a procedure of a second combination process in the combination weigher according to the embodiment 2 of the present invention.

First, the second combination process will be described. FIG. 9 is a flowchart showing the second combination process of the present embodiment.

In step S11, combination calculation is performed using measured values (weight values of the objects to be weighed) of weighing hoppers 4 holding the objects to be weighed whose weight values have been measured by the associated weight sensors 41 to determine as allowable combinations, combinations in which combination weight values which are total measured values are within an allowable range with respect to a target weight value. The process in step S11 is identical to the process of step S1 in FIG. 6, and the optimal combination determined in step S1 corresponds to the allowable combination determined in step S11.

In step S12, specified number m (m: plural number), for example, ten allowable combinations are selected from among all the allowable combinations, by giving priority to allowable combinations in which absolute values of differences between combination weight values and the target weight value are smaller, and the selected allowable combinations are determined as first optimal combinations.

In step S13, one allowable combination in which an absolute value of difference between a combination weight value and the target weight value is smallest is selected from among allowable combinations made up of weighing hoppers 4 other than weighing hoppers 4 making up of one arbitrary first optimal combination and is determined as a second optimal combination corresponding to the one arbitrary first optimal combination. In the same manner, second optimal combinations respectively corresponding to the m first optimal combinations are determined. In this manner, second optimal combinations respectively corresponding to the m first optimal combinations are determined and m optimal combination pairs each consisting of the associated first and second optimal combinations are determined.

In step S14, for each of the optimal combination pairs, absolute values of differences between combination weight values of the first and second optimal combinations composing the optimal combination pair and the target weight value are calculated and a total of the differences is calculated.

In step S15, one optimal combination pair in which the total of the absolute values of the differences calculated in step S14 is smallest is selected, and one of the two optimal combinations composing the pair is determined as the discharge combination (first discharge combination) for discharging the objects to be weighed to the inner chute 6a, and the other of the two optimal combinations is determined as the discharge combination (second discharge combination) for discharging the objects to be weighed to the outer chute 6b or 6c. A determination method of the first and second discharge combinations is predetermined, and any method maybe employed. For example, the first optimal combination may be determined as the first discharge combination and the second optimal combination may be determined as the second discharge combination, or vise versa. Alternatively, serial numbers may be assigned to the weighing hoppers 4, an optimal combination including a weighing hopper 4 with a smallest number may be determined as the first discharge combination, and the other optimal combination may be determined as the second discharge combination, or vice versa. Alternatively, the first and second optimal combinations may be determined according to the magnitude of the combination weight values. For example, an optimal combination with a larger combination weight value may be determined as the first discharge combination and an optimal combination with a smaller combination weight value may be determined as the second discharge combination, or vice versa. In a further alternative, the optimal combination with the larger combination weight value and the optimal combination with the smaller combination weight value may be alternately determined as the first and second discharge combinations, every time combination process is performed.

Whereas in steps S14 and S15, for each optimal combination pair, the total of the absolute values of the differences between the combination weight values of the respective optimal combinations and the target weight value is calculated, and the optimal combination pair in which the total of the absolute values of the differences is smallest is selected to determine the two discharge combinations, the total of squares of the absolute values of the differences between the combination weight values of the respective optimal combinations and the target weight value, may be calculated, and an optimal combination pair in which a total of the squares of the differences is smallest may be selected to determine it as two discharge combinations, for each optimal combination pair.

Subsequently, the third combination process will be described.

Initially, combination calculation is performed using measured values (weight values of the objects to be weighed) of weighing hoppers 4 holding the objects to be weighed whose weight values have been measured by the weight sensors 41 to determine all combinations in which combination weight values which are total measured values are within an allowable range with respect to a target weight value and determine them as allowable combinations. Then, one allowable combination in which an absolute value of a difference between a combination weight value and the target weight value is smallest is selected from among all the allowable combinations, and is determined as a first optimal discharge combination.

Subsequently, one allowable combination in which an absolute value of a difference between a combination weight value and a target weight value is smallest is selected from among allowable combinations made up of weighing hoppers 4 other than the weighing hoppers 4 making up of the first optimal discharge combination and is determined as a second optimal combination. One of the first optimal combination and the second optimal combination is determined as the discharge combination (first discharge combination) for discharging the objects to be weighed to the inner chute, while the other is determined as a discharge combination (second discharge combination) for discharging the objects to be weighed to the outer chute. A determination method of the first discharge combination and the second discharge combination is predetermined as in the case of the second combination process.

As in the example 1 of the embodiment 1, the size of the outer chute collecting hoppers 7b and 7c can be reduced, by configuring the setting in the first, second and third combination processes so that at least one weighing hopper 4 is selected from each of the groups B and C respectively corresponding to the outer chutes 6b and 6c to make up of the discharge combination which discharges the objects to be weighed to the outer chute 6b or 6c, or a maximum number of the weighing hoppers 4 selected from each of the groups B and C is limited to less than the number of the weighing hoppers 4 which would be selected. For example, in the first combination process, in step S2 (FIG. 6), each optimal combination pair may be determined so that at least one optimal combination includes the weighing hoppers 4 selected from both of the groups B and C. In the second combination process, in step S12 (FIG. 9), only an allowable combination including weighing hoppers 4 selected from both of the groups B and C may be selected to determine the first optimal combination. Or, in step S13(FIG. 9), the second optimal combination may be selected in such a manner that, when the first optimal combination is not an allowable combination including weighing hoppers 4 in both of the groups B and C, only an allowable combination including weighing hoppers 4 selected from both of the groups B and C may be selected as a second optimal combination. In the third combination process, the first optimal combination and the second optimal combination may be determined in such a manner that at least one of the first and second optimal combinations includes weighing hoppers 4 selected from both of the groups B and C. In the above case, in the first, second, and third combination processes, if one of the second optimal combinations selected finally includes only weighing hoppers 4 selected from the group B or C, this optimal combination may be determined as the discharge combination for discharging the objects to be weighed to the inner chute 6a and the other may be determined as the discharge combination for discharging the objects to be weighed to the outer chute 6b or 6c.

The alternate discharge operation, such as the double shift operation or the triple shift operation described in the embodiment 1 may be carried out in the configuration shown in FIG. 5. In this case, the objects to be weighed are discharged alternately from the inner chute collecting hopper 7a and the outer chute collecting hopper 7b or 7c, and therefore the two lower chutes 8L and 8R alternately feed the objects to be weighed into two inlets of the packaging machine. In this case, also, as in the example 1 of the embodiment 1, the size of the outer collecting hoppers 7b and 7c can be reduced, by configuring the setting so that at least one weighing hopper 4 is selected from each of the groups B and C respectively corresponding to the outer chutes 6b and 6c to make up of the discharge combination (optimal combination) or a maximum number of the weighing hoppers 4 selected from each of the groups B and C is limited to less than the number of weighing hoppers 4 which would be selected, in the combination process performed to determine the discharge combination for discharging the objects to be weighed at least to the outer chute 6b or 6c.

It is assumed that the total number of weighing hoppers 4 is fourteen, and the number of weighing hoppers 4 to be selected to make up of one discharge combination in the combination process is four, in the configuration of FIG. 5. In this case, when the double shift operation described in the embodiment 1 is carried out, combination calculation is performed using ten measured values, and a combination in which a combination weight value is within an allowable range with respect to a target weight value, and an absolute value of a difference between the combination weight value and the target weight value is smallest, is selected as the discharge combination (optimal combination).

In contrast, in the case of the third combination process, the second optimal combination is selected from ten measured values, while the first optimal combination is always selected from fourteen measured values. It is known that combination weighing precision increases as the number of measured values used in the combination calculation increases. Therefore, if the total number of weighing hoppers 4 is equal, then combination weighing precision for the objects to be weighed which are to be discharged, can be improved as a whole, when using the third combination process rather than using the double shift operation.

In the second combination process, a plurality of first optimal combinations are determined under an extended condition for selecting the first optimal combination in the third combination process, the second optimal combinations respectively corresponding to the first optimal combinations are determined, and the combination pair consisting of associated two optimal combinations in which a total of absolute values of differences between combination weight values and the target weight value is smallest is selected. Therefore, combination weighing precision for the objects to be weighed which are to be discharged can be improved as a whole, when using the second combination process rather than using the third combination process.

In the first combination process, the optimal combination pair is formed by combining two out of all optimal combinations, and one optimal combination pair in which the total of the absolute value of the differences between the combination weight values of the two optimal combinations and the target weight value is smallest is selected. Therefore, combination weighing precision for the objects to be weighed which are to be discharged can be improved as a whole when using the first combination process rather than using the third combination process.

In accordance with the first, second, or third combination process, since the two discharge combinations are determined simultaneously, weights of the objects to be weighed corresponding to the weighing hoppers 4 larger in number can be used in the combination calculation for determining the two discharge combinations, and as a result, combination weighing precision for the objects to be weighed which are to be discharged can be improved as a whole.

In addition, the calculation amount decreases in the order of the first combination process, the second combination process, and the third combination process, and time taken for the combination processes can be decreased in this order.

In the above described embodiments 1 and 2, in a case where the allowable range with respect to the target weight value is set to a range which is not smaller than the target weight value, that is, the lower limit value of the allowable range is set to a value equal to the target weight value, an absolute value of a difference between the combination weight value of the optimal combination or the allowable combination and the target weight value is equal to a value (difference) obtained by subtracting the target weight value from the combination weight value. Therefore, in this case, in step S3 in FIG. 6 and in step S14 in FIG. 9, calculating the total of the absolute value of the difference between the combination weight values of the respective optimal combinations and the target weight value is equivalent to calculating the total of the differences obtained by subtracting the target weight value from the combination weight values of the respective optimal combinations.

In a case where the lower limit value of the allowable range is set to the target weight value, the steps S3 and S4 in FIG. 6 and the steps S14 and S15 in FIG. 9 may be replaced by the operation in which a total of combination weight values of two optimal combinations forming an optimal combination pair is calculated for each optimal combination pair, one optimal combination pair in which a calculated total is smallest is selected, one of two optimal combinations forming the selected pair is determined as a discharge combination (first discharge combination) for discharging the objects to be weighed to the inner chute, and the other is determined as a discharge combination (second discharge combination) for discharging the objects to be weighed to the outer chute. In this case, two discharge combinations identical to those obtained in the steps S3 and S4 and the steps S14 and S15 are obtained.

Figure 10:
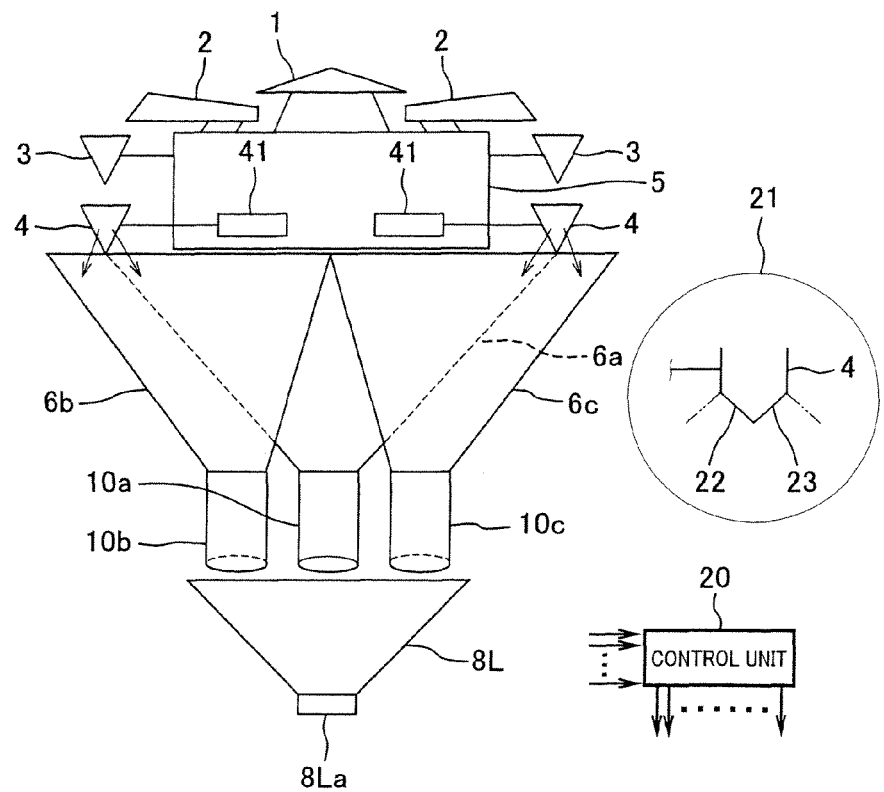
FIG. 10(a) is a schematic partial cross-sectional view showing a configuration example of the combination weigher according to the embodiment 2 of the present invention, which is not equipped with a collecting hopper.
FIG. 10(b) is a schematic view of two lower chutes and pipes in the combination weigher, as viewed from above.
Figure 10:
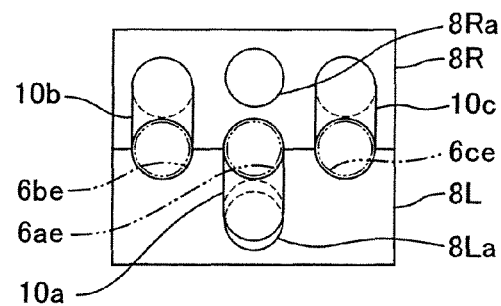

Whereas in the present embodiment, the objects to be weighed are fed to the two packaging machine inlets, the collecting hoppers 7a, 7b and 7c may be also omitted in this case, so long as all of the objects to be weighed which have been discharged from the weighing hoppers 4 slide down on the collecting chute 6a, 6b or 6c in a short time, and therefore packaging operation of the packaging machine is not impeded. In this case, because of the omission of the collecting hoppers, a configuration becomes simple and control therefor is unnecessary. An example of the configuration in this case is shown in FIG. 10. FIG. 10(*a*) is a schematic partial cross-sectional view showing a configuration example of the combination weigher according to the present embodiment, which is not equipped with a collecting hopper as viewed from laterally, and FIG. 10(*b*) is a schematic view of two lower chutes and pipes in the combination weigher as viewed from above. Pipes 10a, 10b and 10c which are tubular chutes are respectively provided at the discharge outlets 6ae, 6be, and 6bc of the collecting chutes 6a, 6b and 6c, the objects to be weighed which have slid down on the inner chute 6a are discharged to the lower chute 8L through the pipe 10a, while the objects to be weighed which have slid down on the outer chute 6b or 6c are discharged to the lower chute 8R through the pipe 10b or 10c.

The control unit 20 may cause weighing hoppers 4 selected to make up of a discharge combination to discharge the objects to be weighed, in response to, for example, a feed command signal from a packaging machine. The objects to be weighed which have been discharged from the weighing hoppers 4 are discharged to the lower chute 8L or 8R through the collecting chute 6a, 6b or 6c and the pipe 10a, 10b, or 10c, and are fed to two packaging machine inlets The alternate discharge operation, such as the double shift operation or the triple shift operation described in the embodiment 1 may be carried out in the configuration shown in FIG. 10. In this case, the objects to be weighed are discharged from weighing hoppers 4 making up of discharge combinations determined sequentially, alternately to the inner chute 6a and to the outer chute 6b or 6c. Therefore, the objects to be weighed are discharged alternately to the two lower chutes 8L and 8R through the associated pipe 10a, 10b, or 10c and are fed alternately into two inlets of the packaging machine.

In the first and second embodiments, the lower chute 8, 8L or 8R, or the pipe 10a, 10b or 10c may be provided at the packaging machine.

Whereas the embodiments 1 and 2 describe that only weighing hoppers 4 are used as combination hoppers which are hoppers (hoppers which participate in combination calculation) holding the objects to be weighed whose measured values are used in combination calculation, such combination hoppers are merely exemplary. FIGS. 11(a), 11(b), 11(c), and 11(d) are plan views schematically showing another examples of hoppers such as combination hoppers. An inner chute 6X in FIGS. 11(a), 11(b), 11(c), and 11(d) corresponds to the inner chute 6a in FIGS. 1, 4, 5, and 10, while an outer chute 6Y in FIGS. 11(a), 11(b), 11(c), and 11(d) corresponds to the outer chutes 6b and 6c, or the like in FIGS. 1, 4, 5, and 10. One weight sensor 41 (see FIGS. 1, 4, and 5) is attached to each of the weighing hoppers 4 in FIGS. 11(a) and 11(b) and the weighing hoppers 4X and 4Y in FIGS. 11(c) and 11(d).

Figure 11:
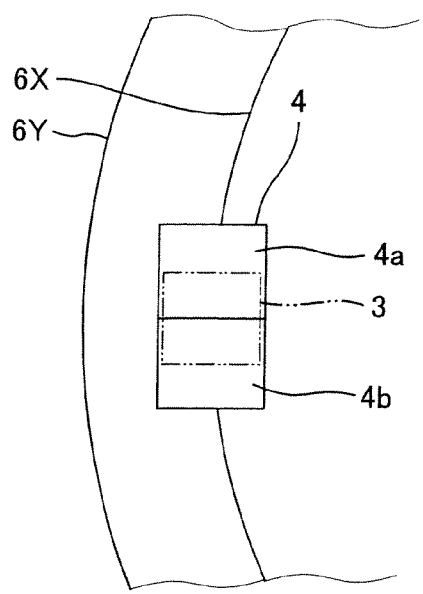
FIGS. 11(a) to 11(d) are schematic views of another examples of hoppers used in the combination weigher in the embodiments 1 and 2 of the present invention.
Figure 11:
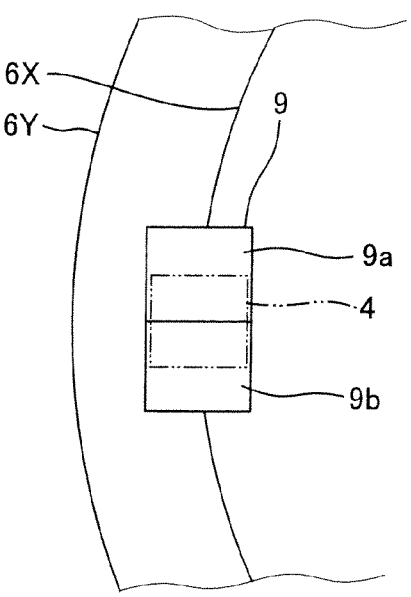
Figure 11:
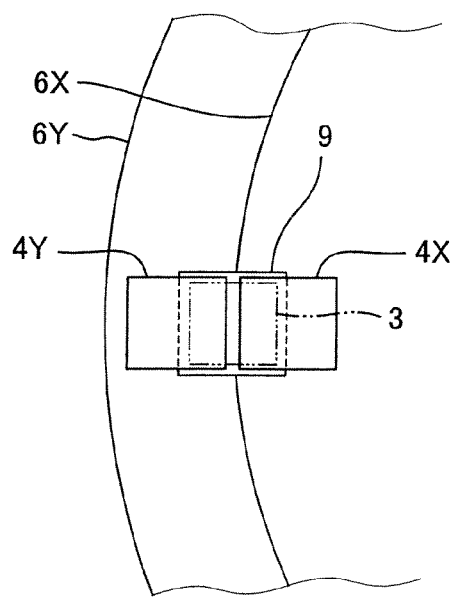
Figure 11:
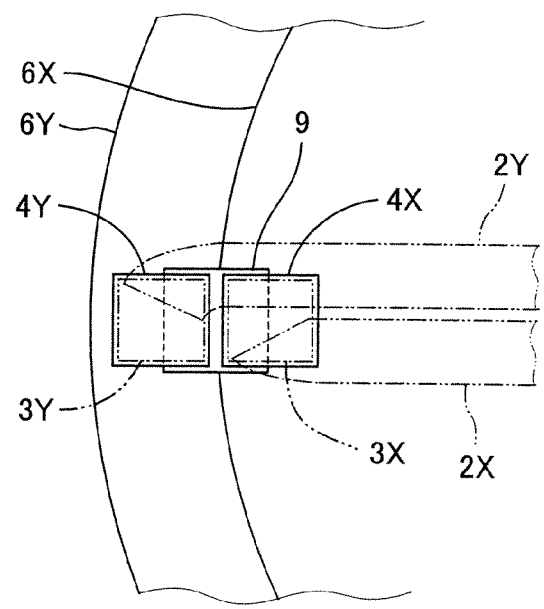
Figure 12:
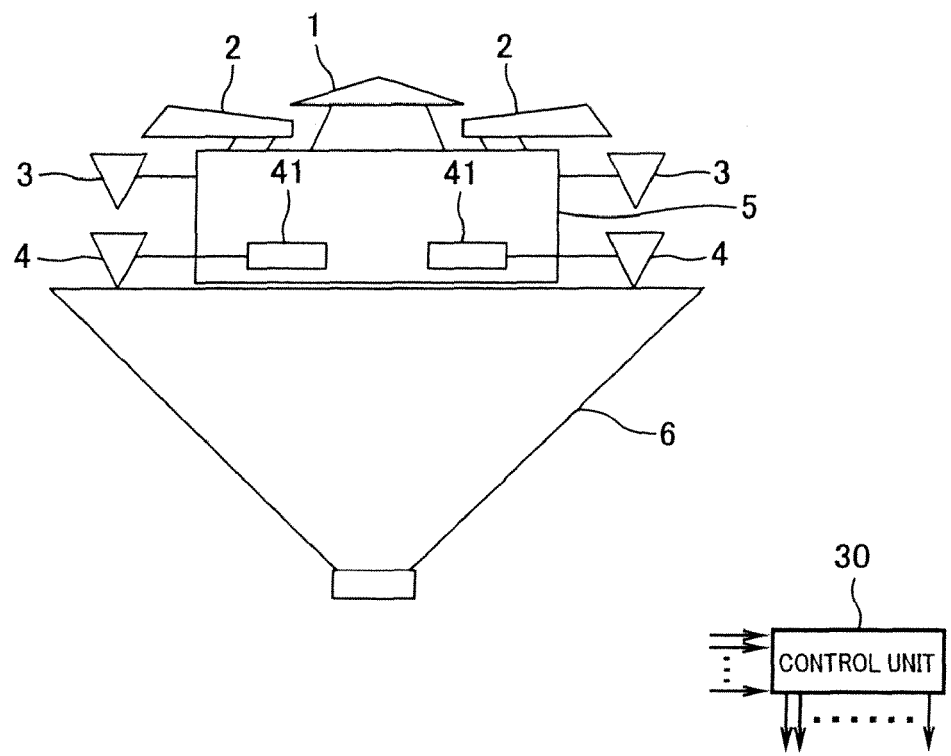
FIG. 12 is a schematic partial cross-sectional view of a combination weigher according to a conventional example 1, as viewed from laterally.
Figure 13:
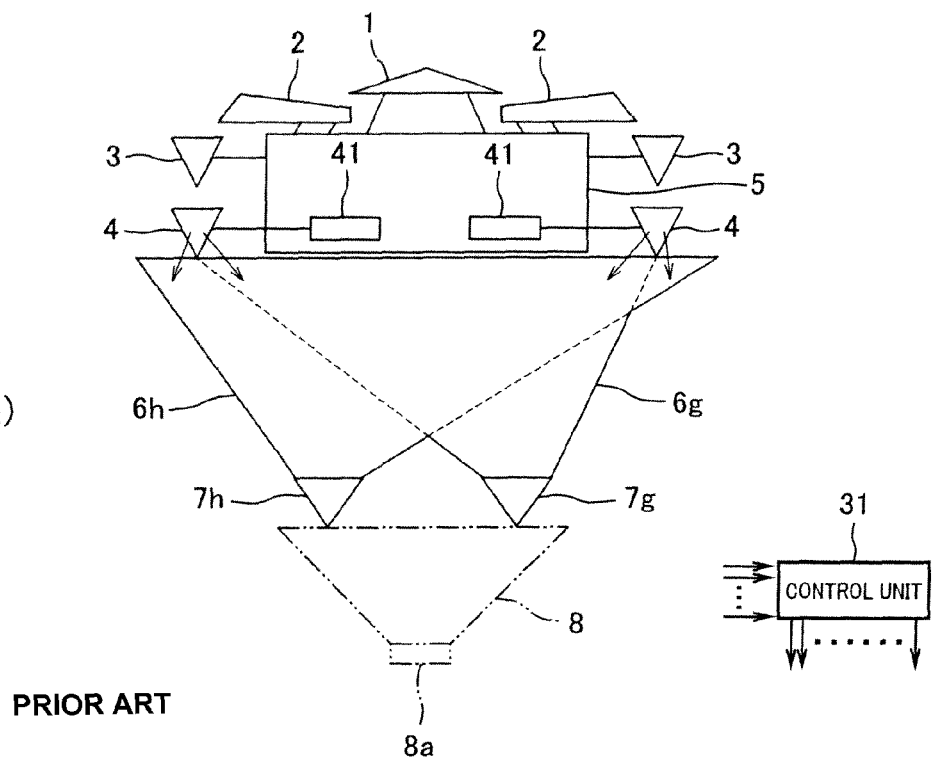
FIG. 13(a) is a schematic partial cross-sectional view of a combination weigher according to a conventional example 2 as viewed from laterally.
FIG. 13(b) is a schematic view showing collecting chutes and weighing hoppers of the combination weigher as viewed from above.
Figure 13:
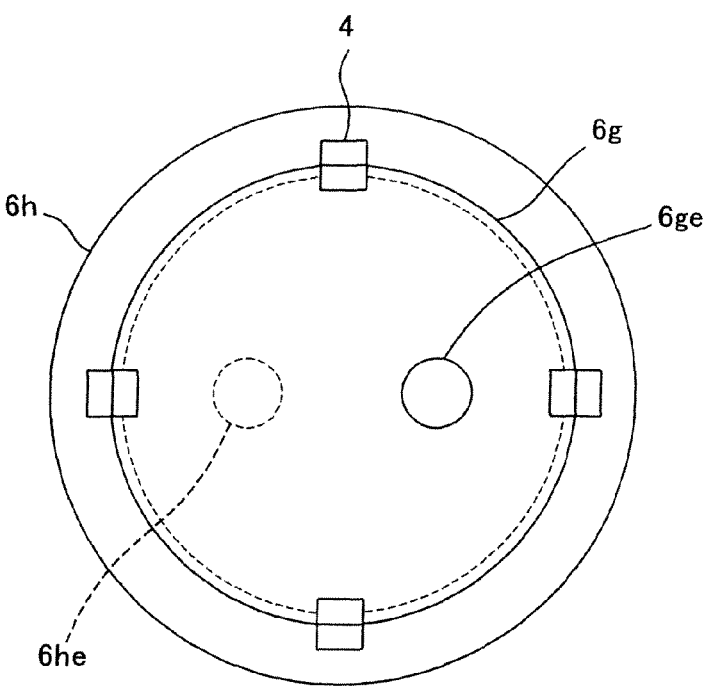

For example, as shown in FIG. 11(a), each weighing hopper 4 is configured to have two chambers (weighing chambers) 4a and 4b which are each fed with the objects to be weighed. The two weighing chambers 4a and 4b of each weighing hopper 4 are arranged side by side substantially in the same direction as the direction in which the plurality of weighing hoppers 4 are arranged. In this case, the feeding hopper 3 is configured to be able to discharge the objects to be weighed selectively to the weighing chamber 4a or to the weighing chamber 4b of the weighing hopper 4. The two weighing hoppers 4a and 4b of the weighing hopper 4 are each configured to be able to discharge the objects to be weighed selectively to the inner chute 6X or to the outer chute 6Y. The combination calculation is performed using weights (measured values) of the objects to be weighed inside the weighing chambers 4a and 4b of each weighing hopper 4, and the weighing chambers 4a and 4b are a candidate for a discharge combination. In each weighing hopper 4, when only one of the weighing chambers, for example, only the weighing chamber 4a holds the objects to be weighed, the weight sensor 41 measures the weight of the objects to be weighed inside the weighing chamber 4a. Then, when the other weighing chamber 4b is fed with the objects to be weighed, the weight sensor 41 measures a total weight of the objects to be weighed inside the two weighing chambers 4a and 4b. The control unit 20 (see FIGS. 1, 4 5, and 10) calculates the weight (measured value) of the objects to be weighed inside the weighing chamber 4b by subtracting the weight of the objects to be weighed inside the weighing chamber 4a from the total weight of the objects to be weighed inside the two weighing chambers 4a and 4b.

In the configuration of FIG. 11(b), a memory hopper 9 is disposed below each weighing hopper 4 and has two chambers (accommodating chambers 9a and 9b) which are fed with the objects to be weighed from the weighing hopper 4. The two accommodating chambers 9a and 9b of each memory hopper 9 are arranged side by side substantially in the same direction as the direction in which a plurality of memory hoppers 9 are arranged. Here, the feeding hopper 3 (see FIGS. 1, 4, 5, and 10) for feeding the objects to be weighed to the weighing hopper 4 is not illustrated. In this case, the weighing hopper 4 is configured to be able to discharge the objects to be weighed selectively to the accommodating chamber 9a or to the accommodating chamber 9b of the memory hopper 9, and not to discharge the objects to be weighed to the outer chute 6Y and to the inner chute 6X. The two accommodating chambers 9a and 9b of each memory hopper 9 are each configured to be able to discharge the objects to be weighed selectively to the inner chute 6X or to the outer chute 6Y. Combination calculation is performed using weights (measured values) of the objects to be weighed inside the accommodating chambers 9a and 9b of each memory hopper 9 and the accommodating chambers 9a and 9b are a candidate for a discharge combination. In this case, the weighing hopper 4 does not participate in the combination calculation. As the weights of the objects to be weighed inside the accommodating chambers 9a and 9b, weights obtained by measurement in the weighing hopper 4 located thereabove are used. Each weighing hopper 4 can participate in the combination calculation provided that the weighing hopper 4 and the accommodating chamber 9a or 9b of the associated memory hopper 9 are selected simultaneously to form a combination. For example, when the weighing hopper 4 and the accommodating chamber 9a (or 9b) of the associated memory hopper 9 are selected simultaneously, the objects to be weighed inside the weighing hopper 4 are discharged to the outer chute 6Y or to the inner chute 6X through the accommodating chamber 9a (or 9b).

In the configuration of FIG. 11(c), weighing hoppers 4X and 4Y respectively attached with the weight sensors 41 are arranged side by side in two lines, and the memory hopper 9 having one chamber fed with the objects to be weighed from the weighing hoppers 4X or 4Y is disposed below the weighing hoppers 4X and 4Y. In this case, the feeding hopper 3 is configured to be able to selectively discharge the objects to be weighed to the weighing hopper 4X or to the weighing hopper 4Y located therebelow, the weighing hopper 4X is configured to be able to discharge the objects to be weighed to the memory hopper 9 or to the inner chute 6X, and the weighing hopper 4Y is configured to be able to discharge the objects to be weighed selectively to the memory hopper 9 or to the outer chute 6Y. The combination calculation is performed using weights (measured values) of the objects to be weighed inside the weighing hoppers 4X and 4Y and inside the memory hopper 9. The combination calculation is performed so that, for example, the weighing hopper 4Y is not selected for a discharge combination of the objects to be weighed which are discharged onto the inner chute 6X, but the weighing hopper 4X and the memory hopper 9 are selected for the discharge combination. Also, the combination calculation is performed so that, for example, the weighing hopper 4X is not selected for a discharge combination of the objects to be weighed which are discharged onto the outer chute 6Y, but the weighing hopper 4Y and the memory hopper 9 are selected for the discharge combination. As the weight of the objects to be weighed inside each memory hopper 9, the weight obtained by measurement in the weighing hopper 4X or 4Y which has fed the objects to be weighed to the memory hopper 9 is used. The weighing hopper 4Y can participate in the combination calculation provided that the memory hopper 9 and the weighing hopper 4Y located thereabove are selected simultaneously to form a combination, when determining the discharge combination for discharging the objects to be weighed to the inner chute 6X. In this case, the objects to be weighed inside the weighing hopper 4Y are discharged to the inner chute 6X through the memory hopper 9. Likewise, the weighing hopper 4X can participate in the combination calculation provided that the memory hopper 9 and the weighing hopper 4X located thereabove are selected simultaneously to form a combination, when determining the discharge combination for discharging the objects to be weighed to the outer chute 6Y. In this case, the objects to be weighed inside the weighing hopper 4X are discharged to the outer chute 6Y through the memory hopper 9.

In the configuration of FIG. 11(d), one feeding hopper 3 in the configuration of FIG. 11(c) has been replaced by two feeding hoppers 3X and 3Y, and hoppers which participate in the combination calculation are the same as those in the configuration of FIG. 11(c). In this case, linear feeders 2X and 2Y are provided to respectively correspond to the feeding hoppers 3X and 3Y and respectively feed the objects to be weighed to the associated feeding hoppers 3X and 3Y, respectively. The feeding hopper 3X feeds the objects to be weighed to the weighing hopper 4X located therebelow, while the feeding hopper 3Y feeds the objects to be weighed to the weighing hopper 4Y located therebelow. In this manner, since the feeding hoppers 3X and 3Y are provided to respectively correspond to the weighing hoppers 4X and 4Y, both of the two weighing hoppers 4X and 4Y forming a pair can be fed with the objects to be weighed simultaneously, if they have been selected simultaneously to make up of a discharge combination and therefore are empty. Thereby, decrease in the number of measured values to be used in later combination calculation can be suppressed so that combination weighing precision can be improved, as compared to the configuration of FIG. 11(c).

In addition to the above described configurations, configuration of hoppers such as combination hoppers can be altered in a variety of ways. In the configurations in FIGS. 1, 4, 5, and 10, one measured value to be used in the combination calculation is obtained for each weight sensor 41 attached on the weighing hopper 4. On the other hand, in the configuration of FIG. 11(a), two measured values to be used in the combination calculation are obtained for each weight sensor 41, while in the configuration of FIG. 11(b), two measured values to be used in the combination calculation are obtained for each weight sensor 41 if the weighing hopper 4 does not participate in the combination calculation and three measured values to be used in the combination calculation are obtained for each weight sensor 41 if the weighing hopper 4 participates in the combination calculation. In the configurations in FIGS. 11(c) and 11(d), three measured values to be used in the combination calculation are obtained for the two weight sensors 41. Therefore, the hopper configurations shown in FIGS. 11(a) to 11(d) enable efficient use of the weight sensors 41 which are expensive. In addition, the hopper configurations shown in FIGS. 11(a) to 11(d) makes it possible to suppress an increase in a diameter of a circle shape in which the combination hoppers are arranged and to increase the number of measured values used in the combination calculation so that improvement of combination weighing precision is achieved.

Moreover, in the above described embodiments 1 and 2, the control unit 20 is not limited to being configured as the single control apparatus, but instead may be configured to include a plurality of control apparatuses disposed in a distributed manner, and these control apparatuses may co-operate to control the operation of the combination weigher.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

A combination weigher of the present invention is useful as a combination weigher coupled to a packaging machine operated at a high speed or a twin-type packaging machine, etc.

The invention claimed is:

1. A combination weigher comprising:
a plurality of combination hoppers which are arranged in a circle shape and are each fed with objects to be weighed, the combination hoppers being each configured to be able to discharge the objects to be weighed selectively in an inward direction of the circle shape or in an outward direction of the circle shape;
an inner chute which is disposed below the combination hoppers and is configured to gather the objects to be weighed which have been discharged in the inward direction from the combination hoppers and to discharge the objects to be weighed from a discharge outlet provided at a bottom part thereof;
a plurality of outer chutes which are disposed below the combination hoppers and are arranged side by side so as to surround the inner chute, the outer chutes being each configured to gather the objects to be weighed which have been discharged in the outward direction from the combination hoppers and to discharge the objects to be weighed from a discharge outlet provided at a bottom part thereof;
a combination calculation means which is configured to determine a first discharge combination and a second discharge combination, the first discharge combination and the second discharge combination each including combination hoppers selected from among combination hoppers disposed above the inner chute and the plurality of outer chutes and each having a combination weight value within an allowable range with respect to a target weight value, the combination weight value being a total of weights of the objects to be weighed which are held by the combination hoppers; and
a control means which is configured to cause the combination hoppers making up of the first discharge combination to discharge the objects to be weighed in the inward direction to discharge the objects to be weighed to the inner chute and to cause the combination hoppers making up of the second discharge combination to discharge the objects to be weighed in the outward direction to discharge the objects to be weighed to the outer chute;
wherein a first collecting hopper is provided at the discharge outlet of the inner chute to hold the objects to be weighed which have been discharged from the discharge outlet of the inner chute and to discharge the objects to be weighed, and a plurality of second collecting hoppers are respectively provided at the discharge outlets of the plurality of outer chutes to hold the objects to be weighed which have been discharged from the discharge outlets of the plurality of outer chutes and to discharge the objects to be weighed;
wherein the control means is configured to control the first collecting hopper holding the objects to be weighed which have been discharged from the combination hoppers and the plurality of second collecting hoppers holding the objects to be weighed which have been discharged from the combination hoppers to cause the first collecting hopper to discharge the objects to be weighed and to cause the plurality of second collecting hoppers to simultaneously discharge the objects to be weighed; and wherein the combination calculation means is configured to determine the second discharge combination so that the objects to be weighed which have been discharged from the combination hoppers making up of the second discharge combination are discharged to at least two of the outer chutes.

2. The combination weigher according to claim 1, wherein the combination calculation means is configured to perform repetitive combination processes in such a manner that:

combination calculation is performed based on weights of objects to be weighed which are held by the combination hoppers to determine as an optimal combination one combination made up of combination hoppers in which a combination weight value is within the allowable range with respect to the target weight value, and the combination calculation is performed based on weights of objects to be weighed which are held by combination hoppers which do not belong to an optimal combination determined in a previous combination process, in a subsequent combination process in n (n: plural number) times of successive combination processes in the repetitive combination processes, to determine optimal combinations determined sequentially in the repetitive combination processes, as the first discharge combination and the second discharge combination alternately;

wherein the control means is configured to cause the combination hoppers making up of the first discharge combination and the combination hoppers making up of the second discharge combination to alternately discharge the objects to be weighed, based on the first discharge combination and the second discharge combination alternately determined by the combination calculation means;

and wherein the control means is configured to feed, to the same packaging machine inlet, the objects to be weighed which have been discharged from the discharge outlet of the inner chute and the objects to be weighed which have been discharged from the discharge outlets of the plurality of outer chutes.

3. The combination weigher according to claim 1, wherein the combination calculation means is configured to perform repetitive combination processes in such a manner that:

combination calculation is performed based on weights of objects to be weighed which are held by the combination hoppers to determine as an optimal combination one combination made up of combination hoppers in which a combination weight value is within the allowable range with respect to the target weight value, and the combination calculation is performed based on weights of objects to be weighed which are held by combination hoppers which do not belong to an optimal combination determined in a previous combination process, in a subsequent combination process in n (n: plural number) times of successive combination processes in the repetitive combination processes, to determine optimal combinations determined sequentially in the repetitive combination processes, as the first discharge combination and the second discharge combination alternately;

wherein the control means is configured to cause the combination hoppers making up of the first discharge combination and the combination hoppers making up of the second discharge combination to alternately discharge the objects to be weighed, based on the first discharge combination and the second discharge combination alternately determined by the combination calculation means;

and wherein the control means is configured to feed the objects to be weighed which have been discharged from the discharge outlet of the inner chute to a first packaging machine inlet, and feed the objects to be weighed which have been discharged from the discharge outlets of the plurality of outer chutes to a second packaging machine inlet.

4. The combination weigher according to claim 1, wherein the combination calculation means is configured to perform a combination process in such a manner that combination calculation is performed based on the weights of the objects to be weighed which are held by the combination hoppers to determine two combinations which do not include the same combination hopper and in which combination weight values obtained in the combination calculation are within the allowable range with respect to the target weight value and to determine one of the two combinations as the first discharge combination and the other as the second discharge combination;

wherein the control means is configured to cause the combination hoppers making up of the first discharge combination and the combination hoppers making up of the second discharge combination to discharge the objects to be weighed simultaneously;

and wherein the control means is configured to feed the objects to be weighed which have been discharged from the discharge outlet of the inner chute to a first packaging machine inlet and the objects to be weighed which have been discharged from the discharge outlets of the plurality of outer chutes to a second packaging machine inlet.

5. The combination weigher according to claim 4, wherein the combination calculation means is configured to perform the combination calculation based on weights of objects to be weighed which are held by combination hoppers which do not belong to the first and second discharge combinations determined in a previous combination process, in a subsequent combination process in k (k: plural number) times of successive combination processes in the repetitive combination processes.

6. The combination weigher according to claim 1, wherein the combination calculation means is configured to perform repetitive combination processes in such a manner that:

combination calculation is performed based on weights of objects to be weighed which are held by the combination hoppers to determine as an optimal combination one combination made up of combination hoppers in which a combination weight value is within the allowable range with respect to the target weight value, and the combination calculation is performed based on weights of objects to be weighed which are held by combination hoppers which do not belong to an optimal combination determined in a previous combination process, in a subsequent combination process in n (n: plural number) times of successive combination processes in the repetitive combination processes, to determine optimal combinations determined sequentially in the repetitive combination processes, as the first discharge combination and the second discharge combination alternately;

wherein the control means is configured to cause the combination hoppers making up of the first discharge combination and the combination hoppers making up of the second discharge combination to alternately discharge the objects to be weighed, and to cause the first collecting hopper and the plurality of second collecting hoppers to discharge the objects to be weighed alternately, based on the first discharge combination and the second discharge combination alternately determined by the combination calculation means;

and wherein the control means is configured to feed, to the same packaging machine inlet, the objects to be weighed which have been discharged from the first collecting hopper and the objects to be weighed which have been discharged from the plurality of second collecting hoppers.

7. The combination weigher according to claim 1, wherein the combination calculation means is configured to perform repetitive combination processes in such a manner that:

combination calculation is performed based on weights of objects to be weighed which are held by the combination hoppers to determine as an optimal combination one combination made up of combination hoppers in which a combination weight value is within the allowable range with respect to the target weight value, and the combination calculation is performed based on weights of objects to be weighed which are held by combination hoppers which do not belong to an optimal combination determined in a previous combination process, in a subsequent combination process in n (n: plural number) times of successive combination processes in the repetitive combination processes, to determine optimal combinations determined sequentially in the repetitive combination processes, as the first discharge combination and the second discharge combination alternately;

wherein the control means is configured to cause the combination hoppers making up of the first discharge combination and the combination hoppers making up of the second discharge combination to alternately discharge the objects to be weighed, and to cause the first collecting hopper and the plurality of second collecting hoppers to discharge the objects to be weighed alternately, based on the first discharge combination and the second discharge combination alternately determined by the combination calculation means;

and wherein the control means is configured to feed the objects to be weighed which have been discharged from the first collecting hopper to a first packaging machine inlet and the objects to be weighed which have been discharged from the plurality of second collecting hoppers to a second packaging machine inlet.

8. The combination weigher according to claim 1, wherein the combination calculation means is configured to perform a combination process in such a manner that combination calculation is performed based on the weights of the objects to be weighed which are held by the combination hoppers to determine two combinations which do not include the same combination hopper and in which combination weight values obtained in the combination calculation are within the allowable range with respect to the target weight value and to determine one of the two combinations as the first discharge combination and the other as the second discharge combination;

wherein the control means is configured to cause the combination hoppers making up of the first discharge combination and the combination hoppers making up of the second discharge combination to discharge the objects to be weighed simultaneously, and to cause the first collecting hopper and the plurality of second collecting hoppers to discharge the objects to be weighed simultaneously;

and wherein the control means is configured to feed the objects to be weighed which have been discharged from the first collecting hopper to a first packaging machine inlet and the objects to be weighed which have been discharged from the plurality of second collecting hoppers to a second packaging machine inlet.

9. The combination weigher according to claim 8, wherein the combination calculation means is configured to perform the combination calculation based on weights of objects to be weighed which are held by combination hoppers which do not belong to the first and second discharge combinations determined in a previous combination process, in a subsequent combination process in k (k: plural number) times of successive combination processes in the repetitive combination processes.

10. The combination weigher according to claim 4, wherein the combination process performed by the combination calculation means includes:

a first process in which combination calculation is performed based on weights of the objects to be weighed which are held by the combination hoppers to determine as optimal combinations, combinations of combination hoppers in which combination weight values are within the allowable range with respect to the target weight value, and an optimal combination pair consisting of two optimal combinations which do not include the same combination hopper is determined; and a second process in which for each optimal combination pair, a total of absolute values of differences between combination weight values of optimal combinations included in the optimal combination pair and the target weight value is calculated, one optimal combination pair in which the total of the absolute values of the differences is smallest is selected, one of two optimal combinations composing the selected optimal combination pair is determined as the first discharge combination and the other is determined as the second discharge combination.

11. The combination weigher according to claim 4, wherein the combination process performed by the combination calculation means includes:

a first process in which combination calculation is performed based on weights of the objects to be weighed which are held by the combination hoppers to determine as allowable combinations, combinations of combination hoppers in which combination weight values are within the allowable range with respect to the target weight value, m (m: plural number) allowable combinations are selected as first optimal combinations from the allowable combinations by giving priority to allowable combinations in which absolute values of differences between combination weight values and the target weight value are smaller, one allowable combination in which an absolute value of a difference between a combination weight value and the target weight value is smallest is selected as a second optimal combination from allowable combinations made up of combination hoppers which are obtained by excluding combination hoppers belonging to each of the first optimal combinations, to determine m optimal combination pairs each consisting of associated first and second optimal combinations; and a second process in which for each optimal combination pair, a total of absolute values of differences between combination weight values of the first and the second optimal combinations included in the optimal combination pair and the target weight value is calculated, one optimal combination pair in which the total of the absolute values of the differences is smallest is selected, one of the first and second optimal combinations composing the selected optimal combination pair is determined as the first discharge combination and the other is determined as the second discharge combination.

12. The combination weigher according to claim 4, wherein the combination process is performed by the combination calculation means in such a manner that combination calculation is performed based on weights of the objects to be weighed which are held by the combination hoppers to determine, as allowable combinations, combinations in which combination weight values are within the allowable range with respect to the target weight value, one allowable combination in which an absolute value of a difference between a combination weight value and the target weight value is smallest is selected as a first optimal combination from all the allowable combinations, one allowable combination in which an absolute value of a difference between a combination weight value and the target weight value is smallest is selected as a second optimal combination from allowable combinations made up of combination hoppers which are obtained by excluding combination hoppers belonging to the first optimal combination, and one of the first and second optimal combinations is determined as the first discharge combination, and the other is determined as the second discharge combination.

13. The combination weigher according to claim 1, wherein the combination hoppers are weighing hoppers each of which has two weighing chambers arranged side by side in a direction in which the combination hoppers are arranged and measures weight of the objects to be weighed which are fed to the weighing chambers, the weighing chambers being each configured to discharge the objects to be weighed selectively in the inward direction or in the outward direction; and
  wherein the combination calculation means is configured to determine the first discharge combination and the second discharge combination such that the first and second discharge combinations each includes weighing chambers holding the objects to be weighed whose total weight is within the allowable range with respect to the target weight value.

14. The combination weigher according to claim 1, wherein a plurality of weighing hoppers are disposed above the combination hoppers to respectively correspond to the combination hoppers to measure weights of the objects to be weighed which are held by the weighing hoppers;
  wherein the combination hoppers are memory hoppers each of which has two accommodating chambers which are fed with the objects to be weighed whose weights have been measured by the weighing hoppers, the accommodating chambers being each configured to discharge the objects to be weighed selectively in the inward direction or in the outward direction;
  wherein the weighing hoppers are each configured to be able to discharge the objects to be weighed selectively to one of two accommodating chambers of an associated memory hopper; and
  wherein the combination calculation means is configured to determine the first discharge combination and the second discharge combination such that the first and second discharge combinations each includes accommodating chambers holding the objects to be weighed whose total weight is within the allowable range with respect to the target weight value.

15. The combination weigher according to claim 1, wherein the combination hoppers are arranged along two upper lines and one lower line, the combination hoppers located on the two upper lines are weighing hoppers each of which measures weight of the objects to be weighed held by the weighing hopper, and the combination hoppers located on the one lower line are memory hoppers each of which corresponds to two weighing hoppers and is fed with the objects to be weighed whose weight has been measured by the weighing hopper;
  wherein the objects to be weighed which are discharged in the inward direction from the weighing hoppers located on an inner line of the two upper lines are discharged to the inner chute, and the objects to be weighed which are discharged in the outward direction from the weighing hoppers located on the inner line are discharged to an associated memory hopper; and
  wherein the objects to be weighed which are discharged in the inward direction from the weighing hoppers located on an outer line of the two upper lines are discharged to the associated memory hopper, and the objects to be weighed which are discharged in the outward direction from the weighing hoppers located on the outer line are discharged to the outer chute.

16. The combination weigher according to claim 1, wherein the combination hoppers are weighing hoppers and include gates and the collecting hoppers include gates, the gates of the weighing hoppers and the gates of the collecting hoppers each having opening and closing timings controlled by the controller, and wherein the opening and closing timings of the gates of the weighing hoppers are controlled based on the opening and closing timings of the gates of the collecting hoppers.

* * * * *

UNITED STATES PATENT AND TRADEMARK OFFICE
CERTIFICATE OF CORRECTION

PATENT NO. : 8,119,935 B2  
APPLICATION NO. : 12/297198  
DATED : February 21, 2012  
INVENTOR(S) : Shozo Kawanishi It is certified that error appears in the above-identified patent and that said Letters Patent is hereby corrected as shown below:

Title Page, Item (75) Inventor:

Delete "Shozo Kawanishi, Nishinomiya (JP)" and replace with -- Shozo Kawanishi, Nishinomiya-shi (JP) --.

Title Page, below Item (54) delete "(75) Inventor" and insert -- (76) Inventor --.

Title Page, below Item (75) delete "(73) Assignee: Shozo Kawanishi, Nishinomiya-shi (JP)".

Signed and Sealed this
Twenty-fifth Day of November, 2014

Michelle K. Lee
*Deputy Director of the United States Patent and Trademark Office*